United States Patent
Yang et al.

(10) Patent No.: US 12,200,694 B2
(45) Date of Patent: Jan. 14, 2025

(54) CONSIDERATIONS FOR INTRA-UE MULTIPLEXING AND SIMULTANEOUS TRANSMISSION

(71) Applicant: QUALCOMM Incorporated, San Diego, CA (US)

(72) Inventors: Wei Yang, San Diego, CA (US); Yi Huang, San Diego, CA (US); Seyedkianoush Hosseini, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/898,811

(22) Filed: Aug. 30, 2022

(65) Prior Publication Data

US 2023/0108891 A1   Apr. 6, 2023

Related U.S. Application Data

(60) Provisional application No. 63/251,439, filed on Oct. 1, 2021.

(51) Int. Cl.
  *H04W 72/1268*   (2023.01)
  *H04W 72/21*   (2023.01)
  *H04W 72/566*   (2023.01)

(52) U.S. Cl.
  CPC ....... *H04W 72/1268* (2013.01); *H04W 72/21* (2023.01); *H04W 72/569* (2023.01)

(58) Field of Classification Search
  CPC ......... H04W 72/1268; H04W 72/1242; H04W 72/1284; H04W 72/56; H04W 72/563; H04W 72/569
  See application file for complete search history.

(56) References Cited

U.S. PATENT DOCUMENTS 10,104,709 B2 * 10/2018 Ahn ...................... H04W 76/10
2011/0275403 A1 * 11/2011 Chen ................... H04W 52/325
  455/522

(Continued)

FOREIGN PATENT DOCUMENTS

| CN | 102238716 A | * 11/2011 | ............ H04W 52/04 |
| WO | WO-2021087966 A1 | 5/2021 | |
| WO | WO-2021101314 A1 | * 5/2021 | ............. H04L 5/001 |

OTHER PUBLICATIONS

International Search Report and Written Opinion—PCT/US2022/042218—ISA/EPO—Dec. 8, 2022. (2108327WO).

*Primary Examiner* — Dinh Nguyen
(74) *Attorney, Agent, or Firm* — Holland & Hart LLP

(57) ABSTRACT

Methods, systems, and devices for wireless communications at a user equipment (UE) are described. A UE may receive control signaling that indicates that the UE is scheduled to transmit a first uplink control channel message during first time domain resources and a first uplink shared channel message during second time domain resources, and the time domain resources may overlap. The UE may identify that the UE includes a UE capability to simultaneously transmit uplink control channel and uplink shared channel messages. The UE may transmit the first uplink control channel message the first component carrier during the first time domain resources and also the first uplink shared channel message during the second time domain resources.

34 Claims, 19 Drawing Sheets

(56) References Cited

U.S. PATENT DOCUMENTS

| | | | |
|---|---|---|---|
| 2018/0167933 A1* | 6/2018 | Yin | H04L 5/0051 |
| 2019/0261288 A1* | 8/2019 | Loehr | H04W 72/0446 |
| 2019/0320431 A1* | 10/2019 | Huang | H04L 5/0053 |
| 2020/0053761 A1 | 2/2020 | Hosseini et al. | |
| 2021/0120504 A1* | 4/2021 | Ohara | H04W 52/50 |

* cited by examiner

Control Signaling 220

PUCCH Transmission 230

PUSCH Transmission 240

CONSIDERATIONS FOR INTRA-UE MULTIPLEXING AND SIMULTANEOUS TRANSMISSION

CROSS REFERENCE

The present Application for Patent claims the benefit of U.S. Provisional Patent Application No. 63/251,439 by YANG et al., entitled "CONSIDERATIONS FOR INTRA-UE MULTIPLEXING AND SIMULTANEOUS TRANSMISSION," filed Oct. 1, 2021, assigned to the assignee hereof, and expressly incorporated by reference herein.

FIELD OF TECHNOLOGY

The following relates to wireless communications at a user equipment (UE), including considerations for intra-UE multiplexing and simultaneous transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device may transmit control channel messages and shared channel messages. However, methods for determining when and how such messages are to be transmitted may be improved.

SUMMARY

The described techniques relate to improved methods, systems, devices, and apparatuses that support intra-UE multiplexing and simultaneous transmission. Generally, the described techniques allow a user equipment (UE) that is capable of simultaneous transmissions to determine whether to transmit messages simultaneously or via multiplexing. A UE may receive control signaling (e.g., from a base station) indicating that the UE is to transmit multiple transmissions (e.g., a control channel transmission and a shared channel transmission). The control signaling may indicate that assigned or scheduled resources for the control channel transmission may overlap with assigned or scheduled resources for the shared channel transmission. As such, the UE may employ simultaneous transmission of the control channel transmission and the shared channel transmission, or may employ a multiplexing approach for the control channel transmission and the shared channel transmission. The UE may determine that the UE may be capable of simultaneous transmission. Further, the UE may transmit the control channel transmission and the shared channel transmission using either simultaneous transmissions or the multiplexing approach. The UE may (e.g., to determine which approach to use) transmit the transmissions based on the determined UE capability for simultaneous transmission and a condition. The condition may include one or more various conditions, such as received signaling indicating enablement of simultaneous transmission, priorities of the transmissions, one or more phase continuity factors, one or more transmit power factors, one or more transmit chain considerations, one or more multiplexing timeline considerations, or any combination thereof.

A method for wireless communications at a user equipment (UE) is described. The method may include receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources, identifying that the UE includes a UE capability to simultaneously transmit uplink control channel and uplink shared channel messages, and transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

An apparatus for wireless communications at a UE is described. The apparatus may include a processor, memory coupled with the processor, and instructions stored in the memory. The instructions may be executable by the processor to cause the apparatus to receive control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources, identify that the UE includes a UE capability to simultaneously transmit uplink control channel and uplink shared channel messages, and transmit, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Another apparatus for wireless communications at a UE is described. The apparatus may include means for receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources, means for identifying that the UE includes a UE capability to simultaneously transmit uplink control channel and uplink shared channel messages, and means for transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

A non-transitory computer-readable medium storing code for wireless communications at a UE is described. The code may include instructions executable by a processor to receive control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources, identify that the UE includes a UE capability to simultaneously transmit uplink control channel and uplink shared channel messages, and transmit, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Some examples of the method, apparatuses, and non-transitory computer-readable medium described herein may further include operations, features, means, or instructions for receiving control signaling indicating that simultaneous transmission of the uplink control channel and uplink shared channel messages may be enabled, where the condition includes receiving the control signaling indicating enablement of simultaneous transmission.

Some examples of the method, apparatuses, and non-transitory computer-readable medium described herein may further include operations, features, means, or instructions for determining that the condition may be satisfied, where the condition may be satisfied by a first priority associated with the first uplink control channel message being different than a second priority associated with the first uplink shared channel message.

Some examples of the method, apparatuses, and non-transitory computer-readable medium described herein may further include operations, features, means, or instructions for determining that the condition may be satisfied, where the condition may be satisfied based on whether a second condition may be satisfied, where the second condition pertains to the UE maintaining phase continuity throughout at least a portion of the transmission of the first uplink control channel message and the first uplink shared channel message.

Some examples of the method, apparatuses, and non-transitory computer-readable medium described herein may further include operations, features, means, or instructions for determining that the second condition may be satisfied, where the UE maintains phase continuity based on a symbol alignment between the first uplink control channel message and the first uplink shared channel message.

In some examples of the method, apparatuses, and non-transitory computer-readable medium described herein, the symbol alignment includes a full overlap in time between the first time domain resources and the second time domain resources.

In some examples of the method, apparatuses, and non-transitory computer-readable medium described herein, the UE maintains phase continuity based on the first uplink control channel message and the first uplink shared channel message being scheduled on a same band.

Some examples of the method, apparatuses, and non-transitory computer-readable medium described herein may further include operations, features, means, or instructions for determining that the condition may be satisfied, where the condition may be satisfied by the first uplink control channel message and the first uplink shared channel message being scheduled on different bands.

Some examples of the method, apparatuses, and non-transitory computer-readable medium described herein may further include operations, features, means, or instructions for determining that the condition may be satisfied, where the condition may be satisfied by a total transmit power associated with the first uplink control channel message and the first uplink shared channel message being less than or equal to a maximum transmit power capability of the UE.

Some examples of the method, apparatuses, and non-transitory computer-readable medium described herein may further include operations, features, means, or instructions for determining the total combined transmit power based on a most recently transmitted power headroom report transmitted by the UE.

In some examples of the method, apparatuses, and non-transitory computer-readable medium described herein, the most recently transmitted power headroom report includes a power headroom report transmitted within a threshold number of slots or symbols prior to either a slot or symbol in which the first uplink control channel message may be scheduled or a slot or symbol in which the first uplink shared channel message may be scheduled.

Some examples of the method, apparatuses, and non-transitory computer-readable medium described herein may further include operations, features, means, or instructions for determining that the condition may be satisfied, where the condition may be satisfied by a number of transmit chains of which the UE may be capable of utilizing being greater than or equal to a number of transmit chains associated with transmitting both the first uplink control channel message and the first uplink shared channel message.

In some examples of the method, apparatuses, and non-transitory computer-readable medium described herein, the number of transmit chains may be associated with transmitting both the first uplink control channel message and the first uplink shared channel message and may be based on one or more precoders associated with transmission of the first uplink control channel message, the first uplink shared channel message, or both.

In some examples of the method, apparatuses, and non-transitory computer-readable medium described herein, the number of transmit chains associated with transmission of the first uplink shared channel message may be based on a rank of the first uplink shared channel message.

In some examples of the method, apparatuses, and non-transitory computer-readable medium described herein, the number of transmit chains of which the UE may be capable may be based on one or more antennas of the UE being dedicated to transmission of uplink shared channel messages.

In some examples of the method, apparatuses, and non-transitory computer-readable medium described herein, the number of transmit chains of which the UE may be capable may be based on one or more antennas of the UE being designated for use with both the first component carrier and the second component carrier.

Some examples of the method, apparatuses, and non-transitory computer-readable medium described herein may further include operations, features, means, or instructions for determining that the condition may be satisfied, where the condition may be satisfied at least in part by at least one of a grant associated with the first uplink control channel message or a grant associated with the first uplink shared channel message being less than a threshold time before the first uplink control channel message or the first uplink shared channel message, respectively, where the threshold time may be associated with a multiplexing timeline.

In some examples of the method, apparatuses, and non-transitory computer-readable medium described herein, the condition defines that, upon failure of the condition to be satisfied, the UE may be to multiplex an uplink control information of the first uplink control channel message onto the first uplink shared channel message on the second component carrier during the second time domain resources.

In some examples of the method, apparatuses, and non-transitory computer-readable medium described herein, the condition defines that, upon failure of the condition to be satisfied, the UE may be to drop a first channel associated with either the first uplink control channel message or the first uplink shared channel message that may have a lower priority than a priority of a second channel associated with either the first uplink control channel message or the first uplink shared channel message and that the UE may be to transmit either the first uplink control channel message or the first uplink shared channel message using the second channel.

A method is described. The method may include transmitting, to a UE, control signaling that schedules the UE for transmission of a first uplink control channel message on a first component carrier during first time domain resources and a first uplink shared channel message on a second component carrier during second time domain resources, where the second time domain resources at least partially overlap in time with the first time domain resources, identifying that the UE includes a UE capability to simultaneously transmit uplink control channel and uplink shared channel messages, and receiving, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

An apparatus is described. The apparatus may include a processor, memory coupled with the processor, and instructions stored in the memory. The instructions may be executable by the processor to cause the apparatus to transmit, to a UE, control signaling that schedules the UE for transmission of a first uplink control channel message on a first component carrier during first time domain resources and a first uplink shared channel message on a second component carrier during second time domain resources, where the second time domain resources at least partially overlap in time with the first time domain resources, identify that the UE includes a UE capability to simultaneously transmit uplink control channel and uplink shared channel messages, and receive, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Another apparatus is described. The apparatus may include means for transmitting, to a UE, control signaling that schedules the UE for transmission of a first uplink control channel message on a first component carrier during first time domain resources and a first uplink shared channel message on a second component carrier during second time domain resources, where the second time domain resources at least partially overlap in time with the first time domain resources, means for identifying that the UE includes a UE capability to simultaneously transmit uplink control channel and uplink shared channel messages, and means for receiving, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

A non-transitory computer-readable medium storing code is described. The code may include instructions executable by a processor to transmit, to a UE, control signaling that schedules the UE for transmission of a first uplink control channel message on a first component carrier during first time domain resources and a first uplink shared channel message on a second component carrier during second time domain resources, where the second time domain resources at least partially overlap in time with the first time domain resources, identify that the UE includes a UE capability to simultaneously transmit uplink control channel and uplink shared channel messages, and receive, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Some examples of the method, apparatuses, and non-transitory computer-readable medium described herein may further include operations, features, means, or instructions for transmitting control signaling indicating that simultaneous transmission of the uplink control channel and uplink shared channel messages may be enabled, where the condition includes receiving the control signaling indicating enablement of simultaneous transmission.

Some examples of the method, apparatuses, and non-transitory computer-readable medium described herein may further include operations, features, means, or instructions for determining that the condition may be satisfied, where the condition may be satisfied by a first priority associated with the first uplink control channel message being different than a second priority associated with the first uplink shared channel message.

Some examples of the method, apparatuses, and non-transitory computer-readable medium described herein may further include operations, features, means, or instructions for determining that the condition may be satisfied, where the condition may be satisfied based on whether a second condition may be satisfied, where the second condition pertains to the UE maintaining phase continuity throughout at least a portion of the transmission of the first uplink control channel message and the first uplink shared channel message.

Some examples of the method, apparatuses, and non-transitory computer-readable medium described herein may further include operations, features, means, or instructions for determining that the second condition may be satisfied, where the UE maintains phase continuity based on a symbol alignment between the first uplink control channel message and the first uplink shared channel message.

In some examples of the method, apparatuses, and non-transitory computer-readable medium described herein, the symbol alignment includes a full overlap in time between the first time domain resources and the second time domain resources.

In some examples of the method, apparatuses, and non-transitory computer-readable medium described herein, the UE maintains phase continuity based on the first uplink control channel message and the first uplink shared channel message being scheduled on a same band.

Some examples of the method, apparatuses, and non-transitory computer-readable medium described herein may further include operations, features, means, or instructions for determining that the condition may be satisfied, where the condition may be satisfied by the first uplink control channel message and the first uplink shared channel message being scheduled on different bands.

Some examples of the method, apparatuses, and non-transitory computer-readable medium described herein may further include operations, features, means, or instructions for determining that the condition may be satisfied, where the condition may be satisfied by a total transmit power associated with the first uplink control channel message and the first uplink shared channel message being less than or equal to a maximum transmit power capability of the UE.

Some examples of the method, apparatuses, and non-transitory computer-readable medium described herein may further include operations, features, means, or instructions for determining the total combined transmit power based on a most recently transmitted power headroom report transmitted by the UE.

In some examples of the method, apparatuses, and non-transitory computer-readable medium described herein, the most recently transmitted power headroom report includes a power headroom report transmitted within a threshold number of slots or symbols prior to either a slot or symbol in which the first uplink control channel message may be scheduled or a slot or symbol in which the first uplink shared channel message may be scheduled.

Some examples of the method, apparatuses, and non-transitory computer-readable medium described herein may further include operations, features, means, or instructions for determining that the condition may be satisfied, where the condition may be satisfied by a number of transmit chains of which the UE may be capable of utilizing being greater than or equal to a number of transmit chains associated with transmitting both the first uplink control channel message and the first uplink shared channel message.

In some examples of the method, apparatuses, and non-transitory computer-readable medium described herein, the number of transmit chains may be associated with transmitting both the first uplink control channel message and the first uplink shared channel message and may be based on one or more precoders associated with transmission of the first uplink control channel message, the first uplink shared channel message, or both.

In some examples of the method, apparatuses, and non-transitory computer-readable medium described herein, the number of transmit chains associated with transmission of the first uplink shared channel message may be based on a rank of the first uplink shared channel message.

In some examples of the method, apparatuses, and non-transitory computer-readable medium described herein, the number of transmit chains of which the UE may be capable may be based on one or more antennas of the UE being dedicated to transmission of uplink shared channel messages.

In some examples of the method, apparatuses, and non-transitory computer-readable medium described herein, the number of transmit chains of which the UE may be capable may be based on one or more antennas of the UE being designated for use with both the first component carrier and the second component carrier.

Some examples of the method, apparatuses, and non-transitory computer-readable medium described herein may further include operations, features, means, or instructions for determining that the condition may be satisfied, where the condition may be satisfied at least in part by at least one of a grant associated with the first uplink control channel message or a grant associated with the first uplink shared channel message being less than a threshold time before the first uplink control channel message or the first uplink shared channel message, respectively, where the threshold time may be associated with a multiplexing timeline.

In some examples of the method, apparatuses, and non-transitory computer-readable medium described herein, the condition defines that, upon failure of the condition to be satisfied, the UE may be to multiplex an uplink control information of the first uplink control channel message onto the first uplink shared channel message on the second component carrier during the second time domain resources.

In some examples of the method, apparatuses, and non-transitory computer-readable medium described herein, the condition defines that, upon failure of the condition to be satisfied, the UE may be to drop a first channel associated with either the first uplink control channel message or the first uplink shared channel message that may have a lower priority than a priority of a second channel associated with either the first uplink control channel message or the first uplink shared channel message and that the UE may be to transmit either the first uplink control channel message or the first uplink shared channel message using the second channel.

DETAILED DESCRIPTION

In the course of wireless communications, a user equipment (UE) may transmit physical uplink control channel (PUCCH) messages and physical uplink shared channel (PUSCH) messages. In some instances, a PUCCH message and PUSCH message may be scheduled to be transmitted in time resources that may overlap. Some UEs are not capable of simultaneous transmission of multiple messages, and therefore may resort to a multiplexing procedure to transmit such messages. However, more advanced UEs may be capable of simultaneously transmitting both a PUCCH and a PUSCH. For example, a PUCCH may be scheduled to be transmitted on a primary cell (PCell), while one or more PUSCHs may be scheduled to be transmitted on one or more secondary cells (SCells). A UE capable of simultaneous transmissions may transmit, simultaneously, the PUCCH on the PCell and the one or more PUSCHs on the SCells. Alternatively, there may be times that the advanced UEs may instead elect to still multiplex the uplink control information (UCI) of the PUCCH on the PUSCH. Criteria for when a UE capable of simultaneous transmissions should indeed transmit simultaneous transmissions or multiplex UCI onto PUSCH have yet to be defined.

Conditions for simultaneous transmission of multiple messages (e.g., PUSCH and PUCCH messages) are described herein for when a UE is capable and enabled for simultaneous transmissions. Even when a UE is capable and enabled for simultaneous transmission, the UE may still evaluate other conditions to determine if simultaneous transmissions should occur. In one case, the UE may assume that if the UE is capable and enabled, then the UE should transmit overlapping PUCCH and PUSCH simultaneously. In other cases, the UE will consider one or more of the following factors: if the PUSCH and PUCCH messages have the same or differing priorities; if the PUSCH and PUCCH messages maintain phase continuity; the degree of overlap of the messages (e.g., symbol alignment of the messages); a transmit power available to the UE as compared to the power required for transmitting the messages; a number of transmission ports for transmitting the messages, or a timetable or minimum time threshold between receipt of the control signaling scheduling the PUCCH and PUSCH messages and the PUCCH and PUSCH messages themselves. The UE may then simultaneously transmit the messages (e.g., based on the UE's capability for simultaneous transmission, one or more of the conditions, or a combination thereof) as scheduled and indicated by the control signaling.

Aspects of the disclosure are initially described in the context of wireless communications systems. Aspects of the disclosure are then described with reference to a system and various example transmission schemes. Aspects of the disclosure are further illustrated by and described with reference to apparatus diagrams, system diagrams, and flowcharts that relate to considerations for intra-UE multiplexing and simultaneous transmission.

Figure 1:
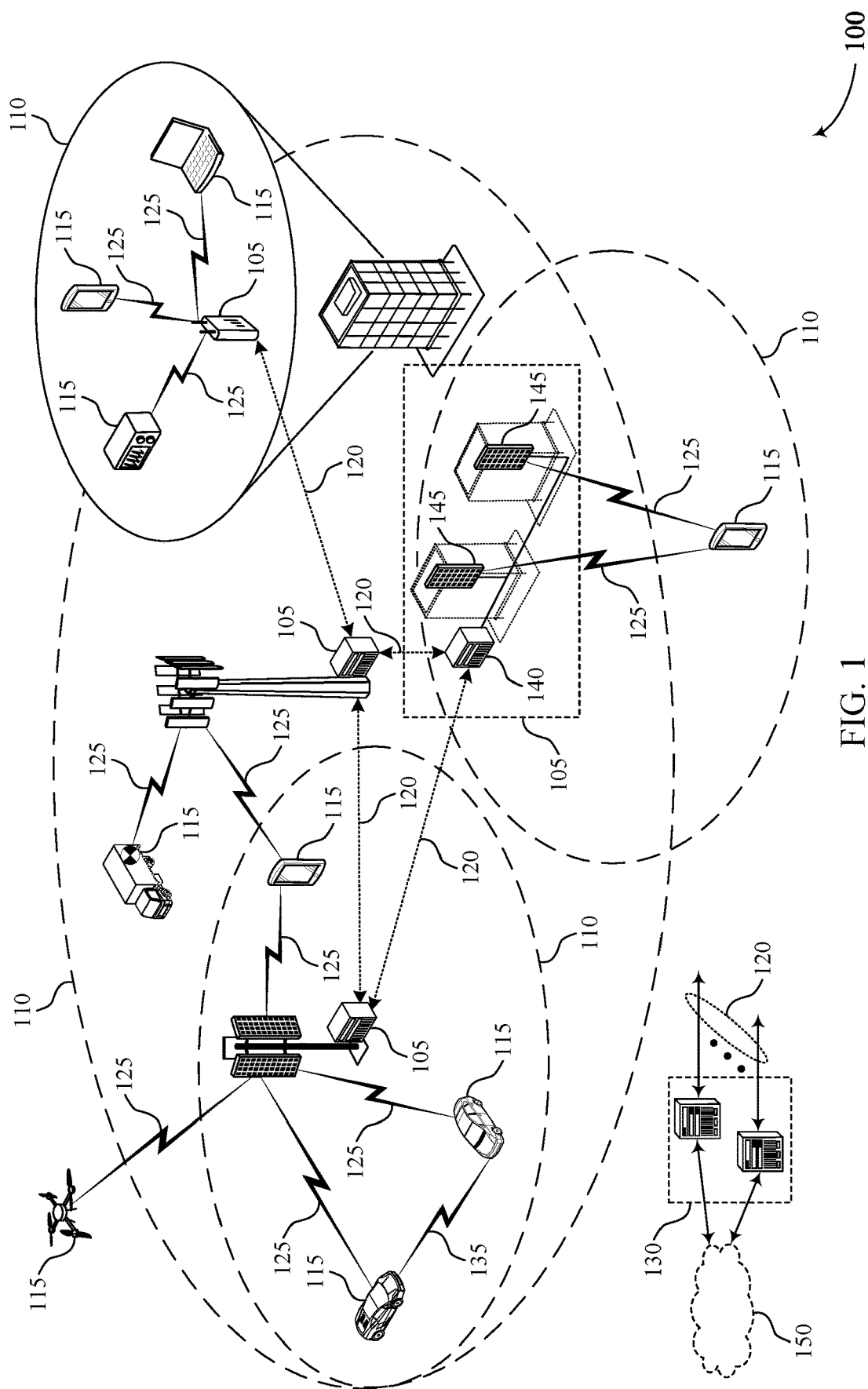
FIG. 1 illustrates an example of a wireless communications system that supports intra-UE multiplexing and simultaneous transmission in accordance with aspects of the present disclosure.

FIG. 1 illustrates an example of a wireless communications system 100 that supports intra-UE multiplexing and simultaneous transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive control signaling (e.g., from a base station 105) that may schedule a PUCCH transmission and a PUSCH transmission, and the control signaling may schedule resources that may overlap at least partially in time. In some examples, the PUCCH transmission may be associated with a first component carrier, and the PUSCH transmission may be associated with a second component carrier. Further, the UE 115 may be capable of simultaneous transmission of the PUCCH transmission and the PUSCH transmission. However, the UE 115 may, depending on one or more factors, transmit the PUCCH transmission and the PUCCH transmissions simultaneously, or may multiplex the PUCCH transmission and the PUSCH transmission. Such factors may include one or more various conditions, such as received signaling indicating enablement of simultaneous transmission, priorities of the transmissions, one or more phase continuity factors, one or more transmit power factors, one or more transmit chain considerations, one or more multiplexing timeline considerations, or any combination thereof. The UE 115 may determine, select, analyze, or otherwise obtain one or more considerations, factors, variables, parameters, values, configurations, or other information, and may transmit the PUCCH transmission and the PUCCH transmission simultaneously (e.g., the UE 115 may transmit the PUCCH transmission over the first component carrier and may transmit the PUSCH transmission over the second component carrier). Additionally, or alternatively, the UE 115 may (e.g., upon failure of one or more conditions) multiplex (e.g., piggyback) the PUCCH transmission and the PUSCH transmission over a single component carrier (e.g., the first or second component carrier). Additionally, or alternatively, the UE 115 may (e.g., upon failure of one or more conditions) engage in a prioritization scheme (e.g., intra-UE prioritization) in which the UE 115 may drop a channel of a lower priority in favor of a channel with a higher priority.

Figure 2:
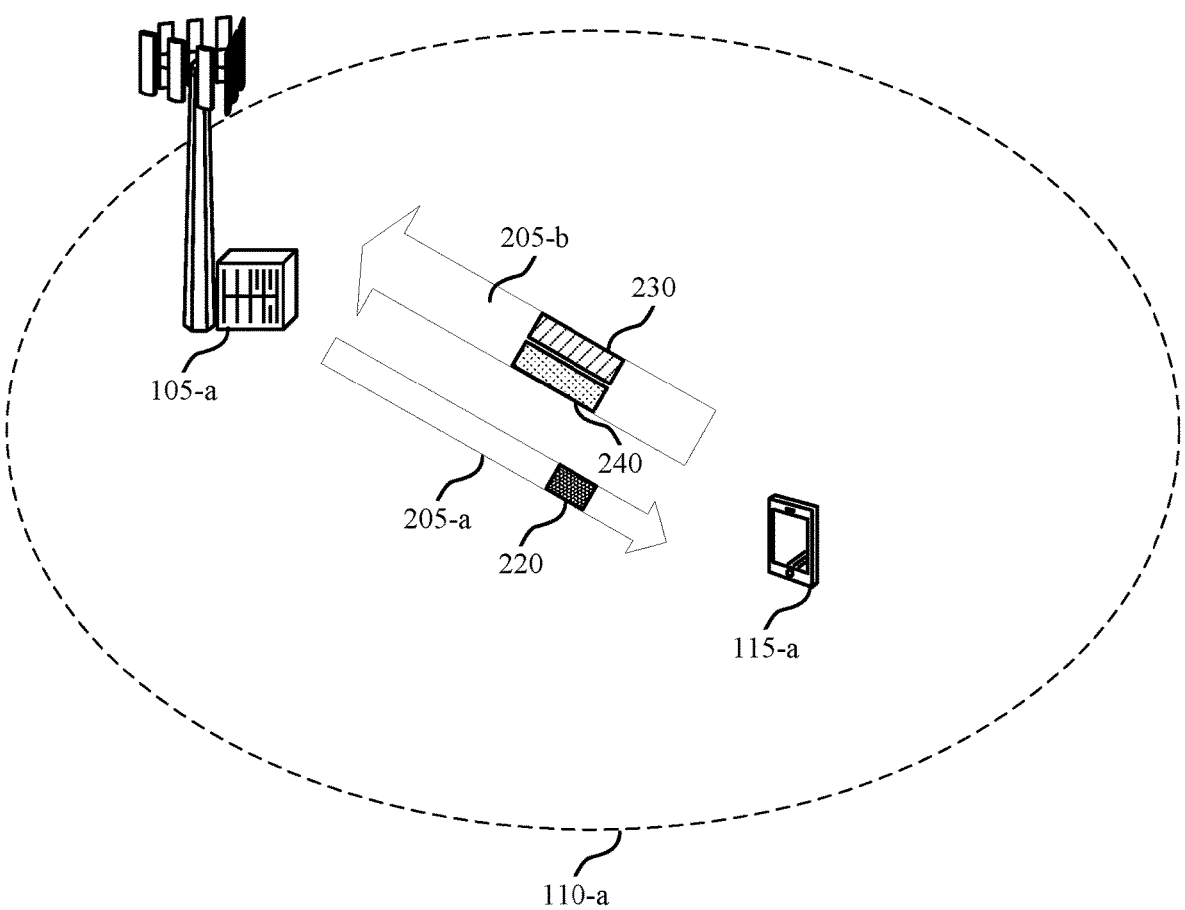
FIG. 2 illustrates an example of a system that supports intra-UE multiplexing and simultaneous transmission in accordance with aspects of the present disclosure.
Figure 2:
Figure 2:
Figure 2:

FIG. 2 illustrates an example of a system 200 that supports intra-UE multiplexing and simultaneous transmission in accordance with aspects of the present disclosure. The system 200 may include a base station 105-a that may be an example of the base station 105 discussed in relation to FIG. 1. The system 200 may include UE 115-a that may be an example of the UE 115 discussed in relation to FIG. 1. In some examples, the base station 105-a and the UE 115 a may be located in a geographic coverage area 110-a. The base station 105-a may communicate with the UE 115-a via one or more downlink communication links 205-a and one or more uplink communication links 205-b. The base station 105-a may transmit control signaling 220 to the UE 115-a (e.g., in accordance with the subject matter disclosed herein), and the UE 115-a may transmit a PUCCH transmission 230 and a PUSCH transmission 240 (e.g., in accordance with the subject matter disclosed herein, such as in connection with a simultaneous transmission scheme or a multiplexing transmission scheme).

Depending on its hardware, software, configuration, or other factors, the UE 115-a may or may not include a capability for simultaneous transmission of multiple messages or transmissions (e.g., the PUCCH transmission 230 and the PUSCH transmission 240). In some examples (e.g., in connection with a multiplexing scheme) a UE without a capability for simultaneous transmission may resolve overlapping scheduled transmissions that have a same priority or a different priority, and may perform one or more operations as a result (e.g., operations associated with the multiplexing scheme). However, when a UE does have a simultaneous transmission capability (e.g., UE 115-a), the UE 115-a, the base station 105, or both, may make one or more determinations or selections based on one or more conditions to implement simultaneous transmission (e.g., the PUCCH transmission 230 and the PUSCH transmission 240) or to implement a multiplexing scheme for the PUCCH transmission 230 and the PUSCH transmission 240.

For example, the base station 105 may transmit the control signaling 220 to the UE 115-a, and the control signaling 220 may indicate that the UE 115-a is to transmit the PUCCH transmission 230 and the PUSCH transmission 240, and scheduled associated resources may overlap in time. Further, the PUCCH transmission 230 may be associated with a first component carrier, and the PUSCH transmission 240 may be associated with a second component carrier. Additionally, the PUCCH transmission 230 may be of a first priority, and the PUSCH transmission 240 may be of a second priority. In some examples, the first priority and the second priority may be the same priority or may be different priorities.

The UE 115-a may resolve the overlap conflict, and determine or select either a multiplexing scheme or a simultaneous transmission scheme. For example, if the UE 115-a resolves the overlap by selecting a simultaneous transmission scheme, the UE 115-a may transmit the PUCCH transmission 230 over the first component carrier, and may simultaneously transmit the PUSCH transmission 240 over the second component carrier. However, if the UE 115-*a* determines to select a multiplexing scheme, the UE 115-*a* may transmit the PUCCH transmission 230 and in the PUSCH transmission 240 in connection with a single component carrier (e.g., by "piggybacking" the PUCCH transmission 230 on the PUSCH transmission 240 or vice versa).

In some examples, the UE 115-*a* may support simultaneous transmission (e.g., of the PUCCH transmission 230 and the PUSCH transmission 240 on corresponding component carriers). Further, the base station 105-*a* may enable or configure the use of simultaneous transmission via an indication to the UE 115-*a* (e.g., in the control signaling 220). In such a situation, the UE 115-*a* may sometimes or always employ a simultaneous transmission scheme (e.g., the use of simultaneous transmission may be of a higher priority or preference than the use of a multiplexing scheme). For example, the base station 105-*a* may configure or enable the use of a simultaneous transmission scheme (e.g., by transmitting control signaling that configures or enables simultaneous transmission of the PUCCH transmission 230 and the PUSCH transmission 240 over a first component carrier and a second component carrier, respectively), and the UE 115-*a* may then always perform such simultaneous transmission (e.g., so long as such use is configured or enabled). In such a case where the base station configures or enables the use of simultaneous transmission, the base station may further configure, enable, modify, or adjust one or more configurations, parameters, or settings to guarantee or support such simultaneous transmission by the UE 115-*a*. For example, a base station may adjust one or more parameters in a communications scheme to support conditions such as message priority, phase alignment or continuity, symbol alignment, time resource overlap, bands used for transmission, transmit power considerations, transmit chains, precoders, ranks associated with transmissions, grants for uplink messages, other parameters or conditions, or any combination thereof. In such a situation, the UE 115-*a* may not expect or anticipate receiving one or more parameters that may conflict with one or more parameters that may support simultaneous transmission. For example, the UE 115-*a* may not expect or anticipate receiving control information that schedules one or more messages in a way that may conflict with, reduce the effectiveness of, or outright prohibit the use of the simultaneous transmission scheme.

In some examples, the base station 105-*a* may verify or request information from the UE 115-*a* indicating the presence or lack of a capability for simultaneous transmission. Additionally, or alternatively, (e.g., instead of always employing a simultaneous transmission scheme when enabled and the UE 115-*a* possesses such a capability), the UE 115-*a* may dynamically determine whether to use simultaneous transmission or a multiplexing scheme (e.g., an intra-UE multiplexing scheme) based on one or more factors, conditions, configurations, indications, information, or any combination thereof.

Additionally, or alternatively, the UE 115-*a* may employ intra-UE prioritization. In intra-UE prioritization, the UE 115-*a* may, when presented with two channels with different priorities (e.g., physical layer priorities) that overlap, the UE 115-*a* may drop a channel with a lower priority and may only employ the high priority channel. In some examples, the UE 115-*a* may determine or select between simultaneous transmission and intra-UE prioritization based on one or more conditions, which may include message priority, phase alignment or continuity, symbol alignment, time resource overlap, bands used for transmission, transmit power considerations, transmit chains, precoders, ranks associated with transmissions, grants for uplink messages, other parameters or conditions, or any combination thereof. For example, if one or more such conditions are satisfied, the UE 115-*a* may employ simultaneous transmission (e.g., of the PUCCH transmission 230 and the PUSCH transmission 240). However, if one or more conditions is not satisfied, the UE 115-*a* may employ intra-UE prioritization.

In some examples, the UE 115-*a* may determine or select between transmission schemes (e.g., a simultaneous transmission scheme or a multiplexing scheme) based on one or more priorities of the messages or transmissions to be transmitted (e.g., the PUCCH transmission 230 and the PUSCH transmission 240). For example, if the PUCCH transmission 230 and the PUSCH transmission 240 are of or are associated with the same priority, the UE 115-*a* may determine or select to transmit the PUCCH transmission 230 and the PUSCH transmission 240 using a multiplexing scheme. However, if the PUCCH transmission 230 and the PUSCH transmission 240 are of differing priorities, the UE 115-*a* may determine or select to transmit the PUCCH transmission 230 and the PUSCH transmission 240 simultaneously.

In some examples, the UE 115-*a* may determine or select between transmission schemes (e.g., a simultaneous transmission scheme or a multiplexing scheme) based on a transmission power associated with the PUCCH transmission 230, a transmission power associated with the PUSCH transmission 240, a transmission power of which the UE 115-*a* is capable, or any combination thereof. For example, if a transmission power of which the UE 115-*a* is capable is not exceeded by a total transmit power for both the PUCCH transmission 230 and the PUSCH transmission 240, then the UE 115-*a* may select or determine to use simultaneous transmission of the PUCCH transmission 230 and the PUSCH transmission 240. However, if the total transmit power for both the PUCCH transmission 230 and the PUSCH transmission 240 does exceed a transmission power of which the UE 115-*a* is capable, then the UE 115-*a* may select or determine to use a multiplexing scheme for transmission of the PUCCH transmission 230 and the PUSCH transmission 240.

In some examples, the base station 105-*a* may not be aware of such a power condition at the UE 115-*a*. For example, since a transmit power of the UE 115-*a* may depend on a pathloss (e.g., a downlink pathloss) measured at the UE 115-*a*, the base station 105-*a* may not have such information. Therefore, in some example, determinations or selections of transmit power associated with the PUCCH transmission 230 and the PUSCH transmission 240 may be based on a power-headroom report (PHR) (e.g., a most-recently transmitted PHR) transmitted by the UE 115-*a* to the base station 105-*a*. A most-recently transmitted PHR may be selected or determined according to a rule, a procedure, or other information that may indicate that the most-recently transmitted PHR may be a recent PHR that may be transmitted a number of symbols or slots prior to an earliest starting symbol of the scheduled PUCCH transmission 230 or the PUSCH transmission 240. Such a time gap may be associated with an amount of time that the base station 105-*a* may use for decoding, analyzing, or otherwise processing the received PHR.

For example, the UE 115-*a*, the base station 105-*a*, or both, may determine a reference total transmit power of the PUCCH transmission 230 and the PUSCH transmission 240, which may be based on a PHR that the UE 115-*a* transmitted to the base station 105-*a*. Such a PHR may indicate how much power remains to be used by the UE 115-*a* on a reference transmission (e.g., a reference PUCCH transmission or a reference PUSCH transmission). Such a reference power may, in some cases, be different from an actual total transmit power used by the UE 115-a to transmit the PUCCH transmission 230 and the PUSCH transmission 240. Additionally, or alternatively, the UE 115-a, the base station 105-a, or both, may determine the transmit power of which the UE 115-a is capable based on the PHR.

In another example, the UE 115-a may identify one or more reference transmissions (e.g., a reference PUCCH transmission or a reference PUSCH transmission, which may be reference transmissions transmitted by the UE, or may be "virtual" reference transmissions that are not transmitted by the UE), and may further transmit a PHR to the base station 105-a. The base station 105-a may calculate a reference transmit power for another PUCCH transmission, another PUSCH transmission, or both, based on the received PHR and the one or more reference transmissions. The base station 105-a may identify a transmit power of which the UE 115-a is capable (e.g., a maximum transmit power) based on the received PHR. The base station 105-a may compare the reference transmit power with the identified transmit power of which the UE 115-a is capable, and may then select or determine between a simultaneous transmission scheme and a multiplexing transmission scheme. For example, if the reference transmit power of the PUCCH transmission 230 and the PUSCH transmission 240 exceeds the identified transmit power of which the UE is capable, then UE may perform either a transmission multiplexing scheme or a transmission channel dropping scheme (e.g., a prioritization scheme). Otherwise, the UE may perform simultaneous transmission of the PUCCH transmission 230 and the PUSCH transmission 240. Additionally, or alternatively, the UE 115-a may also perform the functions of the base station 105-a described herein, so that both the UE 115-a and the base station 105-a may select or determine the same information that may be used in a selection or determination between a simultaneous transmission scheme and a multiplexing transmission scheme or a prioritization scheme.

Figure 3A:
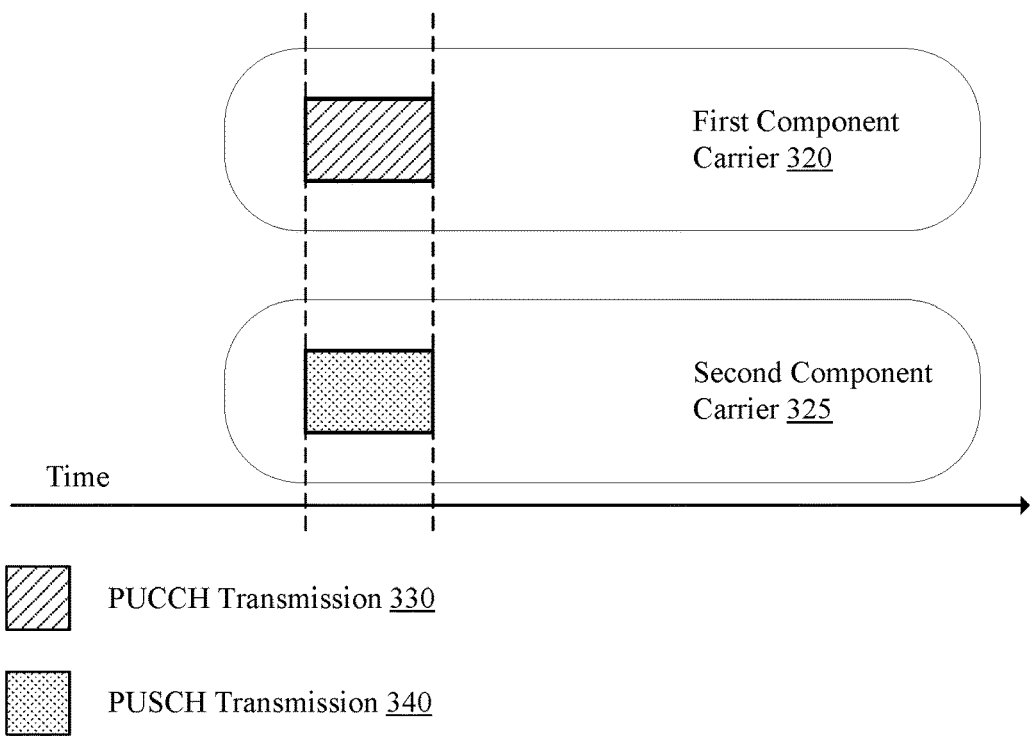
FIGS. 3A and 3B illustrate examples of transmission schemes that support intra-UE multiplexing and simultaneous transmission in accordance with aspects of the present disclosure.
Figure 3B:
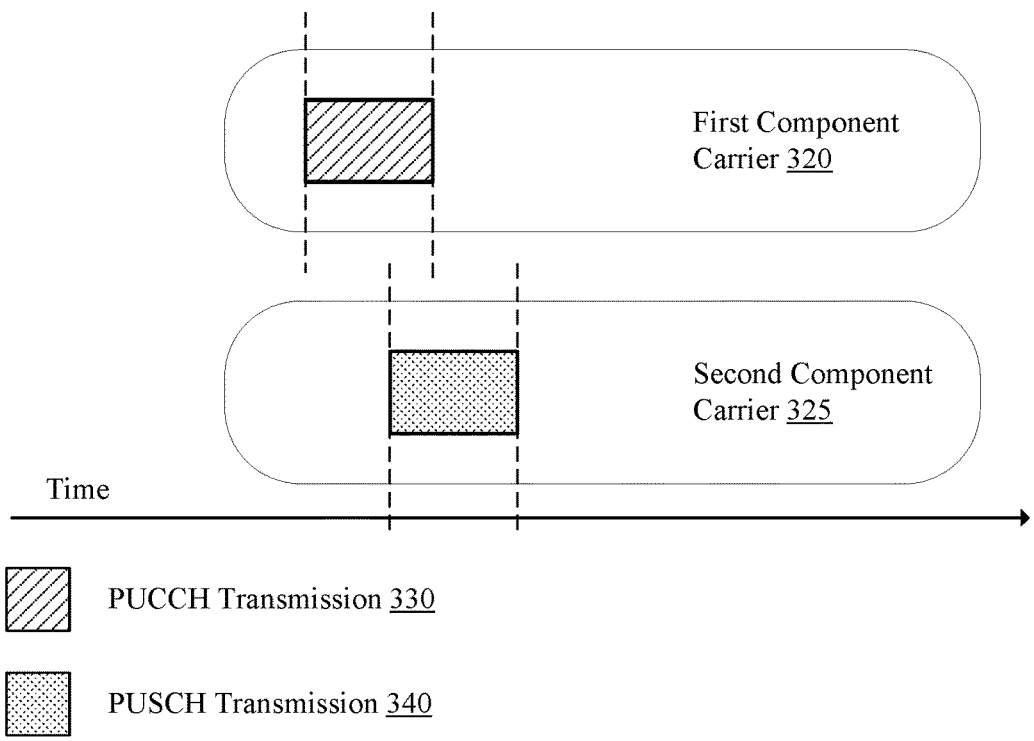

FIGS. 3A and 3B illustrate examples of a transmission scheme 300 and a transmission scheme 305 that support intra-UE multiplexing and simultaneous transmission in accordance with aspects of the present disclosure. FIG. 3A depicts a transmission scheme 300 in which the PUCCH transmission 330 and the PUSCH transmission 340 may be completely overlapping or aligned (e.g., have the same beginning and end points in time, optionally within a threshold), and the PUCCH transmission 330 may be associated with or transmitted over a first component carrier 320 and the PUSCH transmission may be associated with or transmitted over a second component carrier 325. FIG. 3B depicts a transmission scheme 305 in which the PUCCH transmission 330 and the PUSCH transmission 340 may be partially overlapping or misaligned, and the PUCCH transmission 330 may be associated with or transmitted over a first component carrier 320 and the PUSCH transmission may be associated with or transmitted over a second component carrier 325. Depending on factors discussed herein, a UE may transmit the PUCCH transmission 330 and the PUSCH transmission 340 simultaneously (e.g., over the first component carrier 320 and the second component carrier 325, respectively), or may transmit the PUCCH transmission 330 and the PUSCH transmission 340 using a multiplexing scheme (e.g., over a single component carrier, such as the first component carrier 320 or the second component carrier 325) or a prioritization scheme (e.g., in which the UE 115-a may drop a channel with a lower priority and may employ a channel with a higher priority).

In some examples, the UE may determine or select between transmission schemes (e.g., a simultaneous transmission scheme or a multiplexing scheme) based on phase continuity or coherence (e.g., phase continuity or coherence for the PUCCH transmission 330 and the PUSCH transmission 340). For example, if the UE is able to keep phase continuity or coherence for the PUCCH transmission 330 and the PUSCH transmission 340, the UE may select or determine to use a simultaneous transmission scheme (e.g., in which the UE may transmit the PUCCH transmission 330 and the PUSCH transmission 340 over the first component carrier 320 and the second component carrier 325 respectively). However, if the UE is not able to maintain phase continuity or coherence for the PUCCH transmission 330 and the PUSCH transmission 340, the UE may select or determine to use a multiplexing scheme or a prioritization scheme (e.g., in which the UE 115-a may drop a channel with a lower priority and may employ a channel with a higher priority).

For example, and as shown in FIG. 3A, the base station 105-a may schedule the PUCCH transmission 330 and the PUSCH transmission 340 in time resources that may completely overlap or are fully aligned. In such a case, the UE may be able to maintain phase continuity or coherence for the PUCCH transmission 330 and the PUSCH transmission 340. In such a case, the UE may transmit the PUCCH transmission 330 and the PUSCH transmission 340 simultaneously. However, if the base station 105-a schedules the PUCCH transmission 330 and the PUSCH transmission 340 in time resources that partially overlap or may not be fully aligned (e.g., as shown in FIG. 3B), the UE may not be able to maintain phase continuity or coherence for the PUCCH transmission 330 and the PUSCH transmission 340. In such a case, the UE may transmit the PUCCH transmission 330 and the PUSCH transmission 340 using a multiplexing or piggybacking scheme.

Additionally, or alternatively, the base station 105-a may schedule the PUCCH transmission 330 and the PUSCH transmission 340 in one or more bands. For example, the base station 105-a may schedule the PUCCH transmission 330 in a first band and the PUSCH transmission 340 in a second band, or the base station 105-a may schedule both the PUCCH transmission 330 and the PUSCH transmission 340 in the same band. In some examples, if the base station 105-a schedules the PUCCH transmission 330 and the PUSCH transmission 340 in the same band, considerations regarding symbol alignment (e.g., symbol alignment considerations described herein) may apply and the UE may determine or select between the simultaneous transmission scheme and the multiplexing transmission scheme based on such symbol alignment considerations as described herein. However, if the base station 105-a schedules the PUCCH transmission 330 and the PUSCH transmission 340 in different bands, the UE may be able to maintain phase continuity or coherence, and considerations regarding symbol alignment may not apply.

Figure 4A:
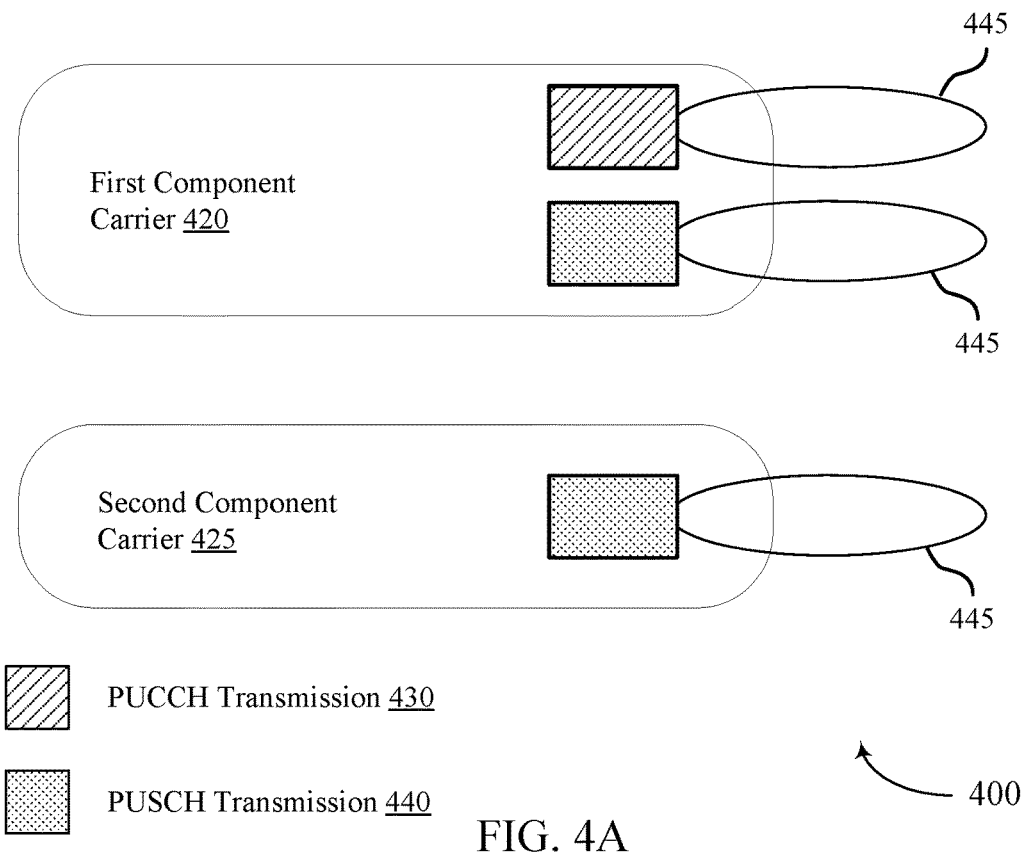
FIGS. 4A and 4B illustrate examples of transmission schemes that support intra-UE multiplexing and simultaneous transmission in accordance with aspects of the present disclosure.
Figure 4B:
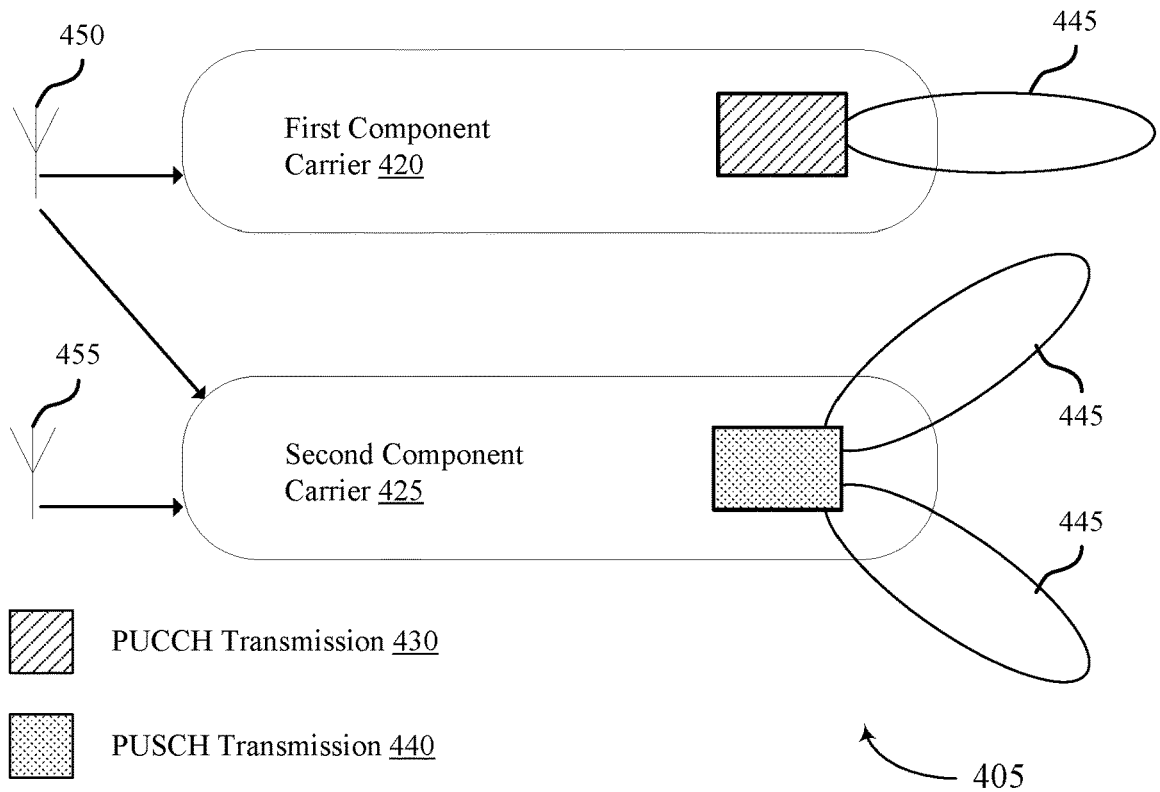

FIGS. 4A and 4B illustrates an example of a transmission scheme 400 and a transmission scheme 405 that supports intra-UE multiplexing and simultaneous transmission in accordance with aspects of the present disclosure. FIG. 4A depicts an example of a transmission scheme 400 that includes a PUCCH transmission 430, a PUSCH transmission 440, a first component carrier 420, a second component carrier 425, and various transmit chains 445. FIG. 4B depicts an example of a transmission scheme 405 that includes the PUCCH transmission 430, the PUSCH transmission 440, the first component carrier 420, the second component carrier 425, and various transmit chains 445. In addition, FIG. 4B depicts a first antenna 450 and a second antenna 455 that may be used for transmission, reception, or both, of wireless communications transmissions.

Generally speaking, a UE may transmit a total number of simultaneous transmissions that may not exceed a number of transmit chains or power amplifiers that the UE has. For example, if a UE only has two transmit antennas, it may not transmit three transmissions simultaneously. In some examples, a UE may determine whether simultaneous transmissions may exceed a capacity of the UE in terms of transmit chains or power amplifiers that the UE has (e.g., for the particular band or band combinations that may be associated with the various transmissions being considered. If the number of potential simultaneous transmissions does exceed such a capacity of the UE, then the UE may employ a multiplexing transmission scheme or a prioritization transmission scheme. For example, if a number of potential simultaneous transmit chains does exceed a number of transmit chains of which the UE is capable, then a condition for simultaneous transmission may not be met, and the UE may not employ a simultaneous transmission scheme, and instead employ a multiplexing transmission scheme or a prioritization transmission scheme. However, if the number of potential simultaneous transmissions does not exceed such a capacity, the UE may select or determine to use a simultaneous transmission scheme. For example, if a number of potential simultaneous transmit chains does not exceed a number of transmit chains of which the UE is capable, then a condition for simultaneous transmission may be met, and the UE may employ a simultaneous transmission scheme.

The UE or base station may determine whether the UE is capable of performing simultaneous transmission based on a number of factors, including a number of transmit chains associated with the various transmissions (e.g., the PUCCH transmission 430 and the PUSCH transmission 440). In some examples, a PUCCH transmission 430 may be associated with a single transmit chain 445, and the PUSCH transmission 440 may be associated with a number of transmit chains 445, and such a number of transmit chains 445 may be determined or selected based on a precoder used (e.g., a total number of non-zero transmit ports that may be used by or associated with the PUSCH transmission 440). For example, a precoder with a designation of [1,0] may use a single transmit chain (or a single transmit port), and a precoder with a designation of [1,1] may use two transmit chains (or two transmit ports) For example, as shown in FIG. 4A, the PUCCH transmission 430 and the PUSCH transmissions 440 may each be associated with a transmit chain 445. Thus there may be three transmit chains, which number may be compared against a transmit chain capability of the UE to select between a simultaneous transmission scheme and a multiplexing transmission scheme.

In some cases, a precoder with a designation of [0,1] may receive special handling. For example, such a precoder with a designation of [0,1] may be treated as involving the use of two antenna ports, since an antenna (e.g., "1" in the precoder designation) may be shared between multiple component carriers, and another antenna may only be associated with a single component carrier. For example, as shown in FIG. 4B, the PUCCH transmission 430 may be associated with a transmit chain 445, and the PUSCH transmission 440 may be associated with two transmit chains 445. However, in this example, the UE may only be fitted with two transmit antennas, first antenna 450 and second antenna 455. The first antenna 450 may be such a shared antenna that may be associated with both the first component carrier 420 and the second component carrier 425. As such, the example shown in FIG. 4B may result in the UE instead employing a multiplexing transmission scheme, since the number of transmit chains 445 associated with the various transmissions may exceed a capacity or capability of the UE. For example, the second component carrier 425 may use the first antenna 450 and the second antenna 455 as transmit antennas. If a precoder is [1,0], then the signal (i.e., the PUSCH transmission 440) may be transmitted using antenna 455. However, if the precoder is [0,1], then the signal (e.g., the PUSCH transmission 440) may be transmitted using the first antenna 450. Further, if the precoder is [1,1], the signal (e.g., the PUSCH transmission 440) may be transmitted using the first antenna 450 and the second antenna 455. Thus, precoder [0,1] may only use one transmit antenna, but since the first antenna 450 is shared between the first component carrier 420 and the second component carrier 425, the UE may not be able to use the first antenna 450 for transmission of the PUCCH transmission 430 the first component carrier 420 and transmission of the PUSCH transmission 440 in the second component carrier 425. As such, the UE may not be able to transmit the PUCCH transmission 430 and the PUSCH transmission 440 simultaneously with a precoder of [0,1].

Additionally, or alternatively, a number of transmit chains 445 associated with the PUSCH transmission 440 may be selected or determined by a rank associated with the PUSCH transmission 440, either with or without regard to a designation of a precoder. In such examples, a UE may modify a precoder (e.g., from [1,1] to [1,0]) if a simultaneous PUCCH transmission 430 is scheduled (e.g., if the base station schedules the PUCCH transmission 430 and the PUSCH transmission 440 in time domain resources that overlap). For example, the UE may be scheduled with the PUCCH transmission 430 in the first component carrier 420, the PUSCH transmission 440 (e.g., a PUSCH transmission with rank 1) in the second component carrier 425, and with a precoder [1,1]. In such a situation, the UE may modify the precoder from [1,1] to another precoder that may only use one transmit antenna (or transmit chains), such as a precoder of [1,0]. By making such a change, the performance of the PUSCH transmission may be degraded. However, the change may also allow the UE to transmit another channel or transmission (i.e., the PUCCH transmission 430) simultaneously.

Figure 5:
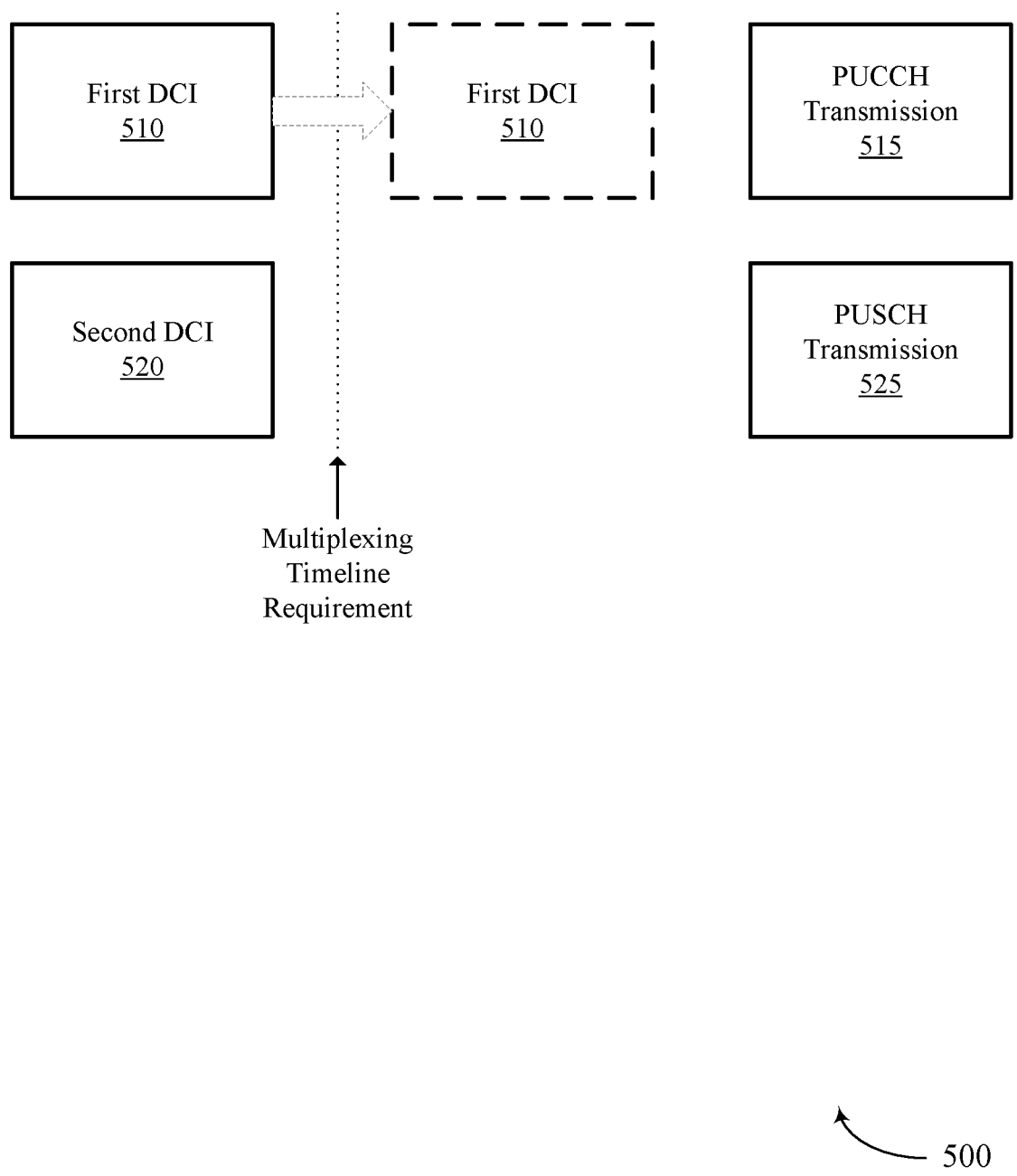
FIG. 5 illustrates an example of a transmission scheme that supports intra-UE multiplexing and simultaneous transmission in accordance with aspects of the present disclosure.

FIG. 5 illustrates an example of a transmission scheme 500 that supports intra-UE multiplexing and simultaneous transmission in accordance with aspects of the present disclosure. The transmission scheme 500 may include a first downlink control information (DCI) 510 associated with a PUCCH transmission 515, and a second DCI 520 associated with a PUSCH transmission 525. Though DCIs are depicted in this example, other messages or control signaling may be used similarly.

In some examples, the UE or base station may determine or select between transmission schemes (e.g., a simultaneous transmission scheme or a multiplexing scheme) based on grants for the overlapping transmissions either meeting or failing to meet a timeline for a multiplexing transmission scheme. For example, if the first DCI 510 and the second DCI 520 are received before a threshold time by which grants are to be received for operation of the multiplexing scheme, then the UE may move to additional factors for determination of whether to employ simultaneous transmission or the multiplexing scheme. In other words, since one or more parameters for the multiplexing scheme have been met, the option of using the multiplexing scheme may still be available to the UE. However, if, for example, a grant (e.g., carried by the first DCI 510) arrives after a threshold time, then a parameter for the multiplexing scheme may not have been met, and the UE may therefore select or determine to use a simultaneous transmission scheme for the PUCCH transmission 515 and the PUSCH transmission 525. In such an example, the base station may then (e.g., based upon signaling received from the UE indicating that a parameter for the multiplexing scheme was not met) adjust one or more parameters to ensure that one or more conditions for the simultaneous transmission scheme (e.g., symbol alignment, power requirements, rank requirements, or other factors as described herein) are sufficient for successful operation of the simultaneous transmission scheme.

Figure 6:
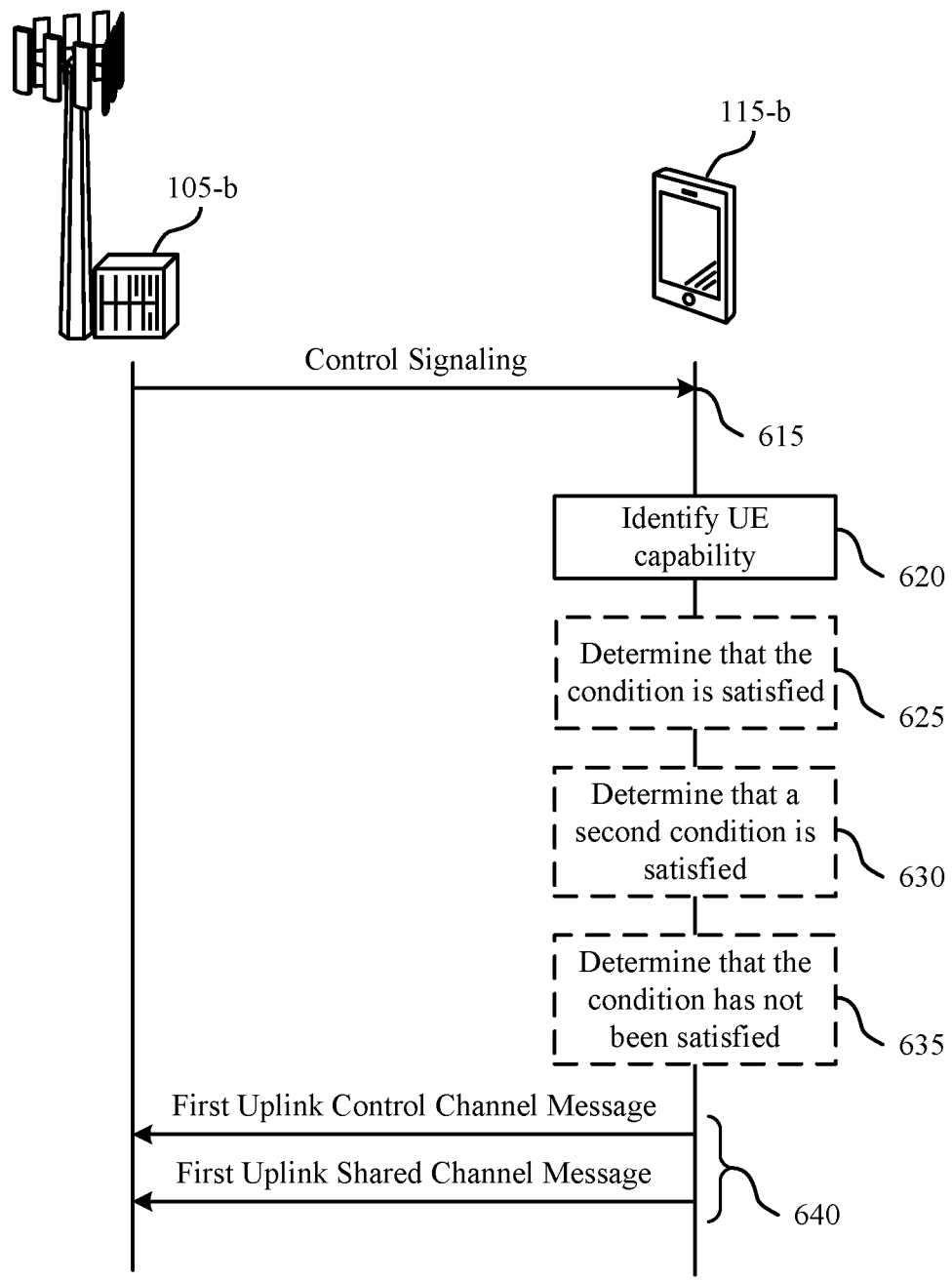
FIG. 6 illustrates an example of a process flow that supports intra-UE multiplexing and simultaneous transmission in accordance with aspects of the present disclosure.

FIG. 6 illustrates an example of a process flow 600 that supports intra-UE multiplexing and simultaneous transmission in accordance with aspects of the present disclosure. The process flow 600 may implement various aspects of the present disclosure described with reference to FIGS. 1-5. The process flow 600 may include a UE 115-b and a base station 105-b, which may be examples of UE 115 and base station 105 as described with reference to FIGS. 1-5.

In the following description of the process flow 600, the operations between the UE 115-b and the base station 105-b may be performed in different orders or at different times. Some operations may also be left out of the process flow 600, or other operations may be added. Although the UE 115-b and the base station 105-b are shown performing the operations of the process flow 600, some aspects of some operations may also be performed by the base station 105-b, the UE 115-b, one or more other wireless devices, or any combination thereof.

At 615, the UE 115-b may receive control signaling that indicates that the UE is scheduled to transmit a first uplink control channel message on a first component carrier during first time domain resources and a first uplink shared channel message on a second component carrier during second time domain resources, and the second time domain resources may at least partially overlap in time with the first time domain resources. In some examples, the UE 115-b may receive control signaling indicating that simultaneous transmission of the uplink control channel and uplink shared channel messages is enabled, and the condition may include receiving the control signaling indicating enablement of simultaneous transmission.

At 620, the UE 115-b may identify that the UE includes a UE capability to simultaneously transmit uplink control channel and uplink shared channel messages.

At 625, the UE 115-b may determine that a condition for simultaneous transmission is satisfied. In some examples, the UE 115-b may determine that the condition is satisfied, and the condition may be satisfied by a first priority associated with the first uplink control channel message being different than a second priority associated with the first uplink shared channel message. In some examples, the UE 115-b may determine that the condition is satisfied, and the condition may be satisfied based at least in part on whether a second condition is satisfied, wherein the second condition pertains to the UE maintaining phase continuity throughout at least a portion of the transmission of the first uplink control channel message and the first uplink shared channel message. In some examples, the UE 115-b may determine that the condition is satisfied, and the condition may be satisfied by the first uplink control channel message and the first uplink shared channel message being scheduled on different bands.

In some examples, the UE 115-b may determine that the condition is satisfied, and the condition may be satisfied by a total transmit power associated with the first uplink control channel message and the first uplink shared channel message being less than or equal to a maximum transmit power capability of the UE. In some examples, the UE 115-b may determine the total combined transmit power based at least in part on a most recently transmitted power headroom report transmitted by the UE. In some examples, the most recently transmitted power headroom report may include or be a power headroom report transmitted within a threshold number of slots or symbols prior to either a slot or symbol in which the first uplink control channel message is scheduled or a slot or symbol in which the first uplink shared channel message is scheduled.

In some examples, the UE 115-b may determine that the condition is satisfied, and the condition may be satisfied by a number of transmit chains of which the UE is capable of utilizing being greater than or equal to a number of transmit chains associated with transmitting both the first uplink control channel message and the first uplink shared channel message. In some examples, the number of transmit chains associated with transmitting both the first uplink control channel message and the first uplink shared channel message may be associated with transmitting both the first uplink control channel message and the first uplink shared channel message and may be based at least in part on one or more precoders associated with transmission of the first uplink control channel message, the first uplink shared channel message, or both. the number of transmit chains associated with transmission of the first uplink shared channel message is based at least in part on a rank of the first uplink shared channel message. In some examples, the number of transmit chains of which the UE is capable may be based at least in part on one or more antennas of the UE being dedicated to transmission of uplink shared channel messages. In some examples, the number of transmit chains of which the UE is capable may be based at least in part on one or more antennas of the UE being designated for use with both the first component carrier and the second component carrier.

In some examples, the UE 115-b may determine that the condition is satisfied, and the condition may be satisfied at least in part by at least one of a grant associated with the first uplink control channel message or a grant associated with the first uplink shared channel message being less than a threshold time before the first uplink control channel message or the first uplink shared channel message, respectively, wherein the threshold time is associated with a multiplexing timeline.

At 630, the UE 115-b may determine that a second condition is satisfied. In some examples, the UE 115-b may determine that the second condition is satisfied, and the UE may maintain phase continuity based at least in part on a symbol alignment between the first uplink control channel message and the first uplink shared channel message. In some examples, the symbol alignment may include a full overlap in time between the first time domain resources and the second time domain resources. In some examples, the UE may maintain phase continuity based at least in part on the first uplink control channel message and the first uplink shared channel message being scheduled on a same band.

At 635, the UE 115-b may determine that the condition has not been satisfied. In some examples, the condition may define that, upon failure of the condition to be satisfied, the UE is to multiplex an uplink control information of the first uplink control channel message onto the first uplink shared channel message on the second component carrier during the second time domain resources. In some examples, the condition may define that, upon failure of the condition to be satisfied, the UE is to drop a first channel associated with either the first uplink control channel message or the first uplink shared channel message that has a lower priority than a priority of a second channel associated with either the first uplink control channel message or the first uplink shared channel message and that the UE is to transmit either the first uplink control channel message or the first uplink shared channel message using the second channel.

At 640, the UE 115-*b* may transmit, based at least in part on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Figure 7:
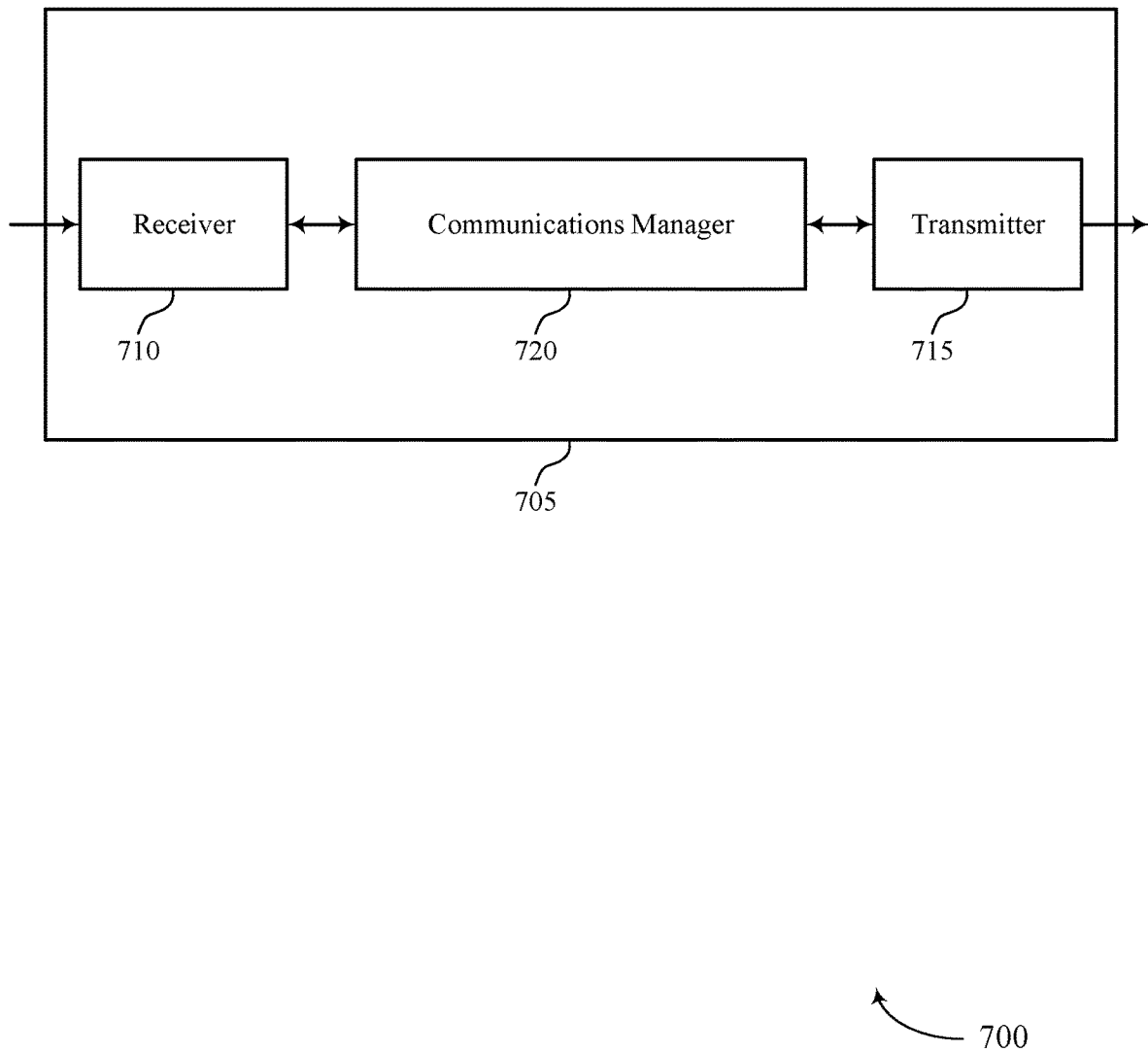
FIGS. 7 and 8 show block diagrams of devices that support intra-UE multiplexing and simultaneous transmission in accordance with aspects of the present disclosure.

FIG. 7 shows a block diagram 700 of a device 705 that supports intra-UE multiplexing and simultaneous transmission in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to intra-UE multiplexing and simultaneous transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to intra-UE multiplexing and simultaneous transmission). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of intra-UE multiplexing and simultaneous transmission as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The communications manager 720 may be configured as or otherwise support a means for identifying that the UE includes a UE capability to simultaneously transmit uplink control channel and uplink shared channel messages. The communications manager 720 may be configured as or otherwise support a means for transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more efficient utilization of communication resources, or a combination thereof.

Figure 8:
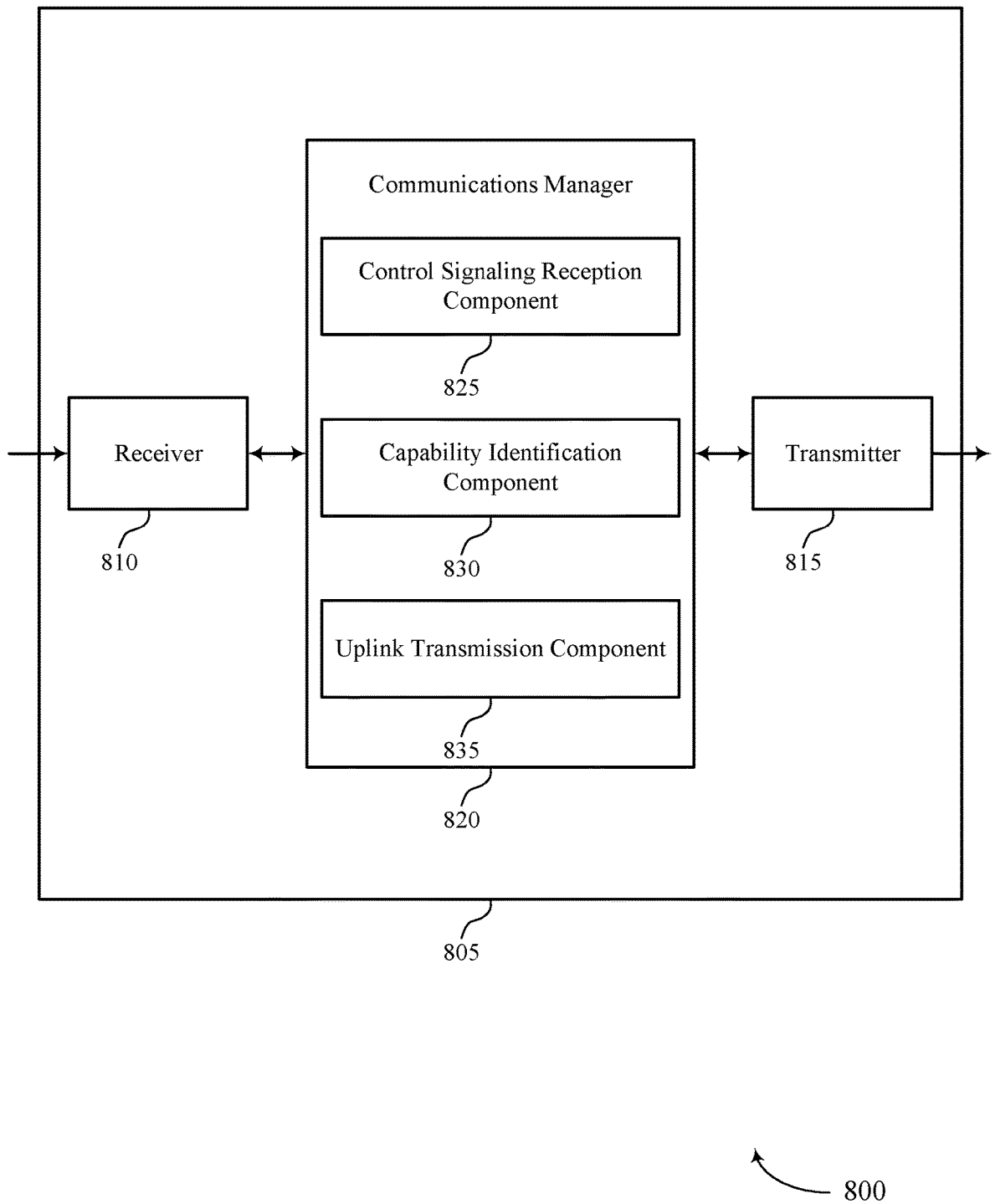

FIG. 8 shows a block diagram 800 of a device 805 that supports intra-UE multiplexing and simultaneous transmission in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to intra-UE multiplexing and simultaneous transmission). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to intra-UE multiplexing and simultaneous transmission). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of intra-UE multiplexing and simultaneous transmission as described herein. For example, the communications manager 820 may include a control signaling reception component 825, a capability identification component 830, an uplink transmission component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The control signaling reception component 825 may be configured as or otherwise support a means for receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The capability identification component 830 may be configured as or otherwise support a means for identifying that the UE includes a UE capability to simultaneously transmit uplink control channel and uplink shared channel messages. The uplink transmission component 835 may be configured as or otherwise support a means for transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Figure 9:
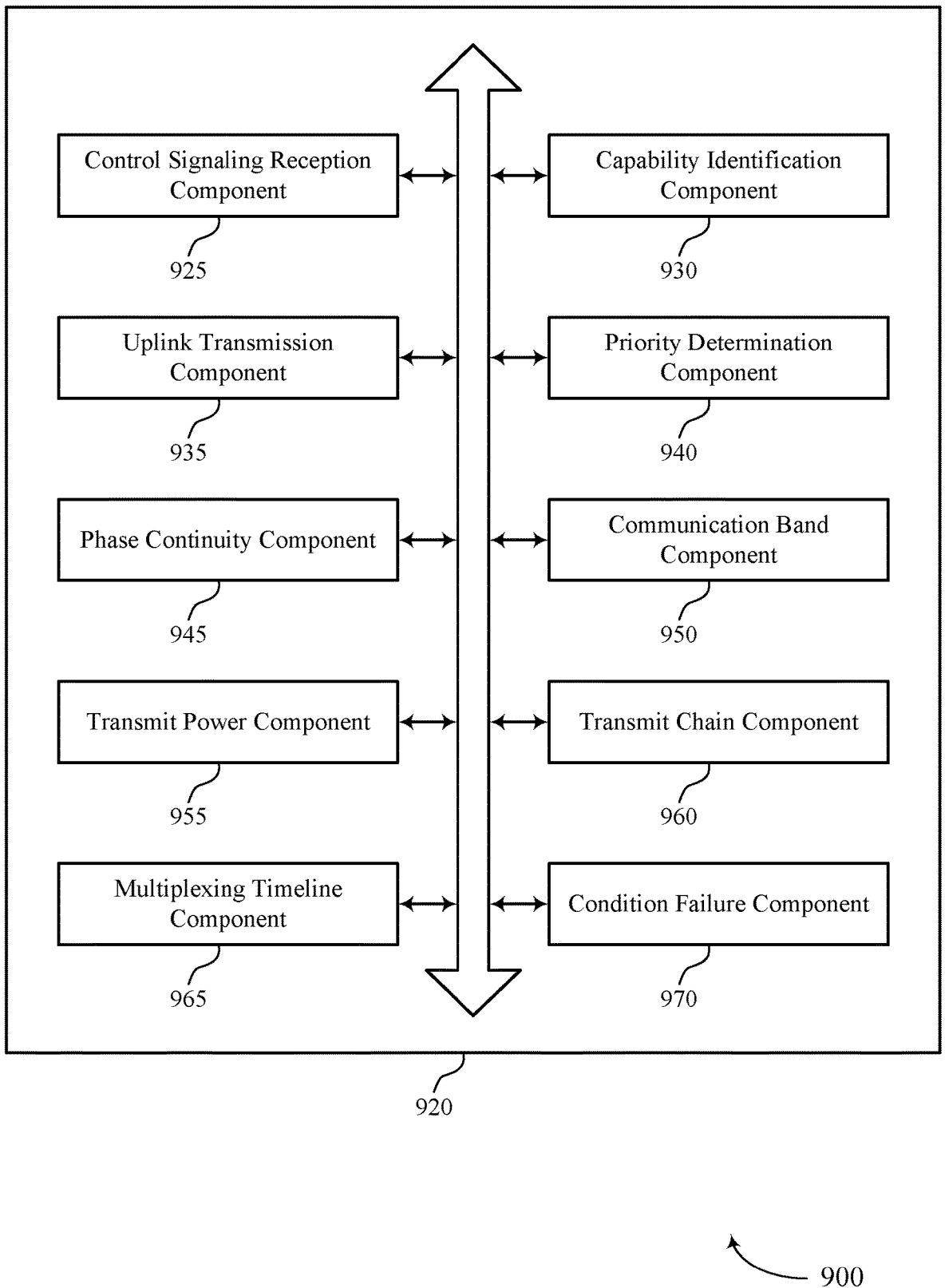
FIG. 9 shows a block diagram of a communications manager that supports intra-UE multiplexing and simultaneous transmission in accordance with aspects of the present disclosure.

FIG. 9 shows a block diagram 900 of a communications manager 920 that supports intra-UE multiplexing and simultaneous transmission in accordance with aspects of the present disclosure. The communications manager 920 may be an example of aspects of a communications manager 720, a communications manager 820, or both, as described herein. The communications manager 920, or various components thereof, may be an example of means for performing various aspects of intra-UE multiplexing and simultaneous transmission as described herein. For example, the communications manager 920 may include a control signaling reception component 925, a capability identification component 930, an uplink transmission component 935, a priority determination component 940, a phase continuity component 945, a communication band component 950, a transmit power component 955, a transmit chain component 960, a multiplexing timeline component 965, a condition failure component 970, or any combination thereof. Each of these components may communicate, directly or indirectly, with one another (e.g., via one or more buses).

The communications manager 920 may support wireless communications at a UE in accordance with examples as disclosed herein. The control signaling reception component 925 may be configured as or otherwise support a means for receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The capability identification component 930 may be configured as or otherwise support a means for identifying that the UE includes a UE capability to simultaneously transmit uplink control channel and uplink shared channel messages. The uplink transmission component 935 may be configured as or otherwise support a means for transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

In some examples, the control signaling reception component 925 may be configured as or otherwise support a means for receiving control signaling indicating that simultaneous transmission of the uplink control channel and uplink shared channel messages is enabled, where the condition includes receiving the control signaling indicating enablement of simultaneous transmission.

In some examples, the priority determination component 940 may be configured as or otherwise support a means for determining that the condition is satisfied, where the condition is satisfied by a first priority associated with the first uplink control channel message being different than a second priority associated with the first uplink shared channel message.

In some examples, the phase continuity component 945 may be configured as or otherwise support a means for determining that the condition is satisfied, where the condition is satisfied based on whether a second condition is satisfied, where the second condition pertains to the UE maintaining phase continuity throughout at least a portion of the transmission of the first uplink control channel message and the first uplink shared channel message.

In some examples, the phase continuity component 945 may be configured as or otherwise support a means for determining that the second condition is satisfied, where the UE maintains phase continuity based on a symbol alignment between the first uplink control channel message and the first uplink shared channel message.

In some examples, the symbol alignment includes a full overlap in time between the first time domain resources and the second time domain resources.

In some examples, the UE maintains phase continuity based on the first uplink control channel message and the first uplink shared channel message being scheduled on a same band.

In some examples, the communication band component 950 may be configured as or otherwise support a means for determining that the condition is satisfied, where the condition is satisfied by the first uplink control channel message and the first uplink shared channel message being scheduled on different bands.

In some examples, the transmit power component 955 may be configured as or otherwise support a means for determining that the condition is satisfied, where the condition is satisfied by a total transmit power associated with the first uplink control channel message and the first uplink shared channel message being less than or equal to a maximum transmit power capability of the UE.

In some examples, the transmit power component 955 may be configured as or otherwise support a means for determining the total combined transmit power based on a most recently transmitted power headroom report transmitted by the UE.

In some examples, the most recently transmitted power headroom report includes a power headroom report transmitted within a threshold number of slots or symbols prior to either a slot or symbol in which the first uplink control channel message is scheduled or a slot or symbol in which the first uplink shared channel message is scheduled.

In some examples, the transmit chain component 960 may be configured as or otherwise support a means for determining that the condition is satisfied, where the condition is satisfied by a number of transmit chains of which the UE is capable of utilizing being greater than or equal to a number of transmit chains associated with transmitting both the first uplink control channel message and the first uplink shared channel message.

In some examples, the number of transmit chains associated with transmitting both the first uplink control channel message and the first uplink shared channel message is associated with transmitting both the first uplink control channel message and the first uplink shared channel message and is based on one or more precoders associated with transmission of the first uplink control channel message, the first uplink shared channel message, or both.

In some examples, the number of transmit chains associated with transmission of the first uplink shared channel message is based on a rank of the first uplink shared channel message.

In some examples, the number of transmit chains of which the UE is capable is based on one or more antennas of the UE being dedicated to transmission of uplink shared channel messages.

In some examples, the number of transmit chains of which the UE is capable is based on one or more antennas of the UE being designated for use with both the first component carrier and the second component carrier.

In some examples, the multiplexing timeline component 965 may be configured as or otherwise support a means for determining that the condition is satisfied, where the condition is satisfied at least in part by at least one of a grant associated with the first uplink control channel message or a grant associated with the first uplink shared channel message being less than a threshold time before the first uplink control channel message or the first uplink shared channel message, respectively, where the threshold time is associated with a multiplexing timeline.

In some examples, the condition defines that, upon failure of the condition to be satisfied, the UE is to multiplex an uplink control information of the first uplink control channel message onto the first uplink shared channel message on the second component carrier during the second time domain resources.

In some examples, the condition defines that, upon failure of the condition to be satisfied, the UE is to drop a first channel associated with either the first uplink control channel message or the first uplink shared channel message that has a lower priority than a priority of a second channel associated with either the first uplink control channel message or the first uplink shared channel message and that the UE is to transmit either the first uplink control channel message or the first uplink shared channel message using the second channel.

Figure 10:
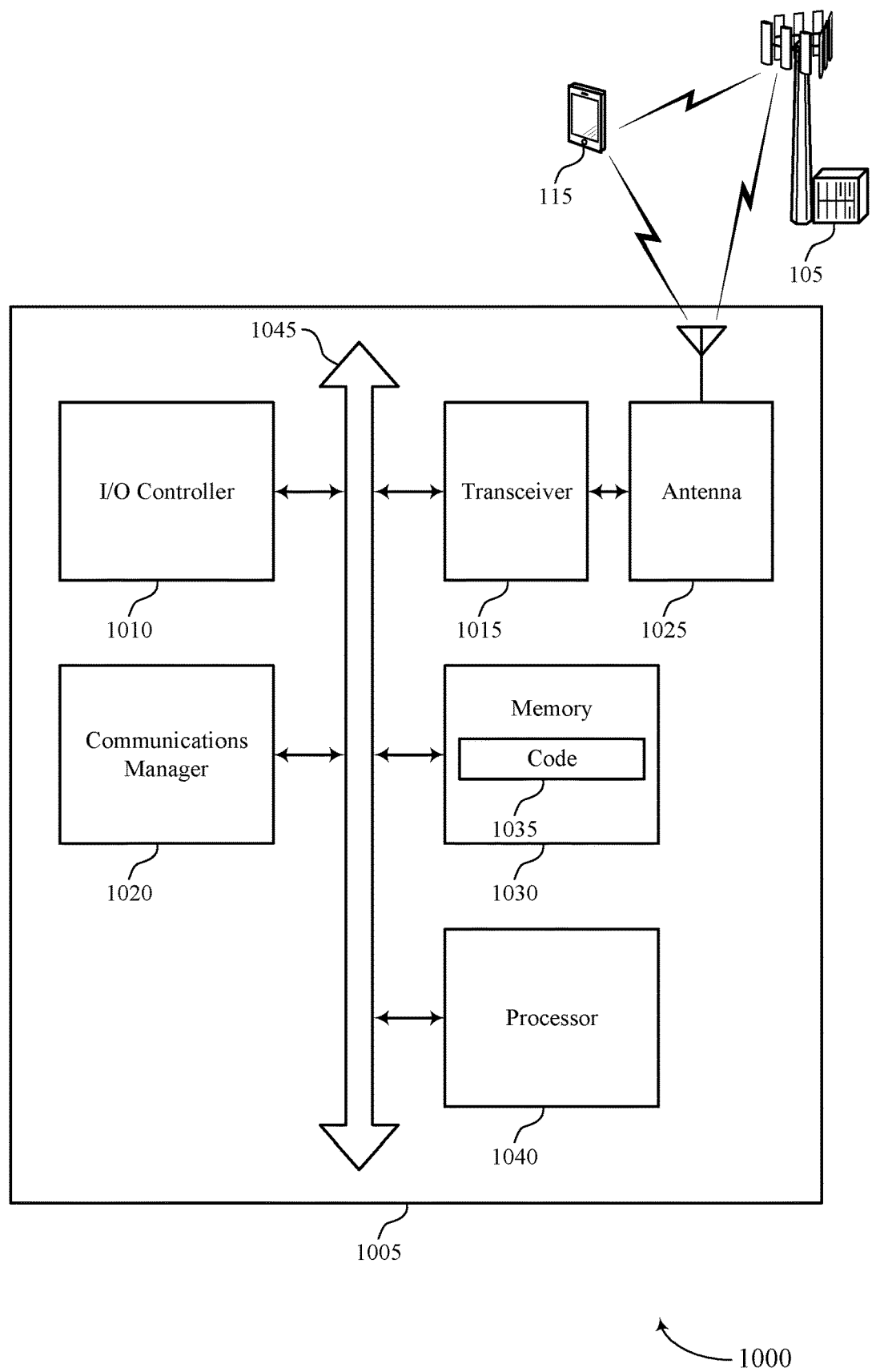
FIG. 10 shows a diagram of a system including a device that supports intra-UE multiplexing and simultaneous transmission in accordance with aspects of the present disclosure.

FIG. 10 shows a diagram of a system 1000 including a device 1005 that supports intra-UE multiplexing and simultaneous transmission in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting intra-UE multiplexing and simultaneous transmission). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The communications manager 1020 may be configured as or otherwise support a means for identifying that the UE includes a UE capability to simultaneously transmit uplink control channel and uplink shared channel messages. The communications manager 1020 may be configured as or otherwise support a means for transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of intra-UE multiplexing and simultaneous transmission as described herein, or the processor 1040 and the memory 1030 may be otherwise configured to perform or support such operations.

Figure 11:
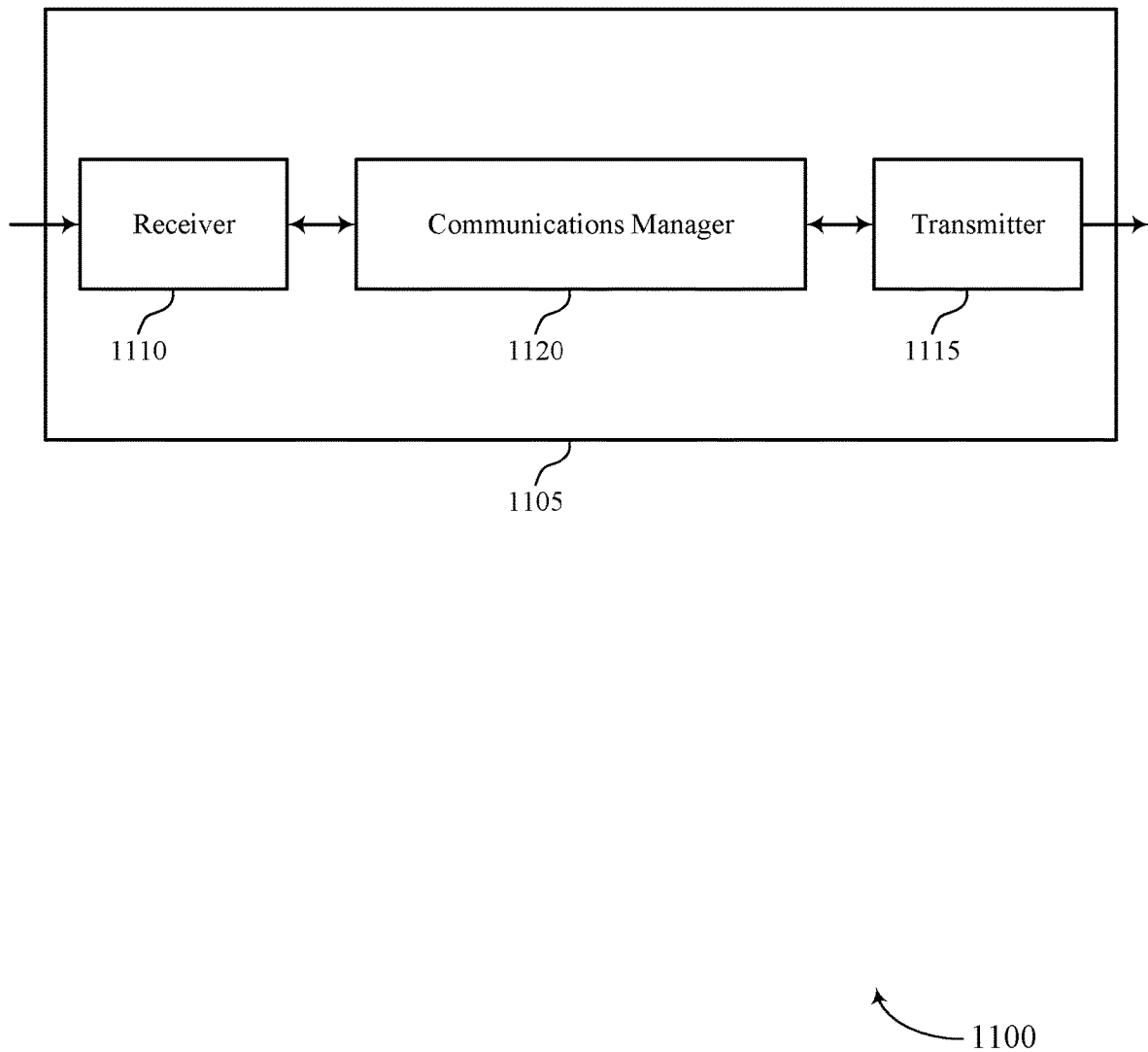
FIGS. 11 and 12 show block diagrams of devices that support intra-UE multiplexing and simultaneous transmission in accordance with aspects of the present disclosure.

FIG. 11 shows a block diagram 1100 of a device 1105 that supports intra-UE multiplexing and simultaneous transmission in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to intra-UE multiplexing and simultaneous transmission). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to intra-UE multiplexing and simultaneous transmission). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of intra-UE multiplexing and simultaneous transmission as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

For example, the communications manager 1120 may be configured as or otherwise support a means for transmitting, to a UE, control signaling that schedules the UE for transmission of a first uplink control channel message on a first component carrier during first time domain resources and a first uplink shared channel message on a second component carrier during second time domain resources, where the second time domain resources at least partially overlap in time with the first time domain resources. The communications manager 1120 may be configured as or otherwise support a means for identifying that the UE includes a UE capability to simultaneously transmit uplink control channel and uplink shared channel messages. The communications manager 1120 may be configured as or otherwise support a means for receiving, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, more efficient utilization of communication resources, or a combination thereof.

Figure 12:
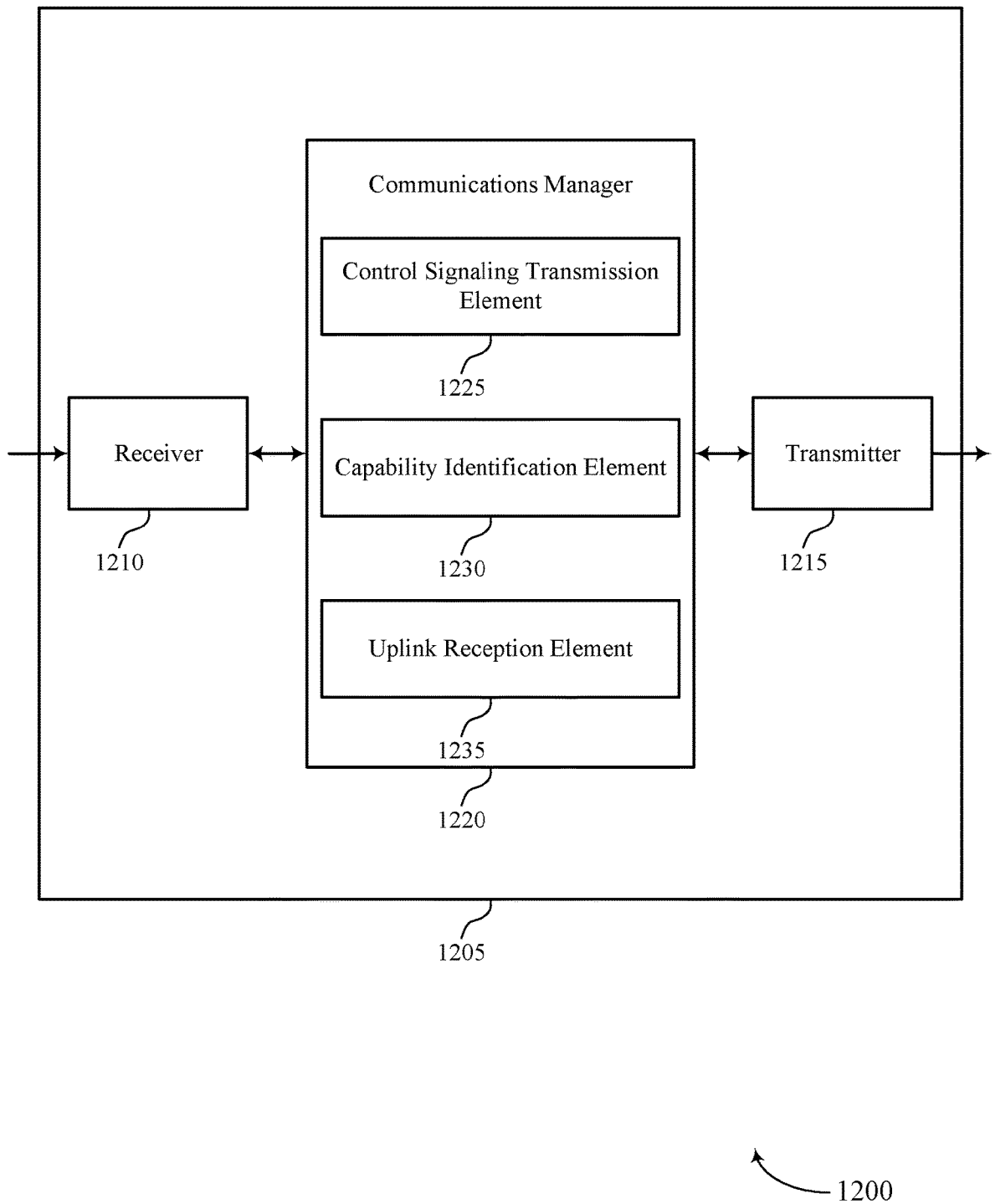

FIG. 12 shows a block diagram 1200 of a device 1205 that supports intra-UE multiplexing and simultaneous transmission in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to intra-UE multiplexing and simultaneous transmission). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to intra-UE multiplexing and simultaneous transmission). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of intra-UE multiplexing and simultaneous transmission as described herein. For example, the communications manager 1220 may include a control signaling transmission element 1225, a capability identification element 1230, an uplink reception element 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The control signaling transmission element 1225 may be configured as or otherwise support a means for transmitting, to a UE, control signaling that schedules the UE for transmission of a first uplink control channel message on a first component carrier during first time domain resources and a first uplink shared channel message on a second component carrier during second time domain resources, where the second time domain resources at least partially overlap in time with the first time domain resources. The capability identification element 1230 may be configured as or otherwise support a means for identifying that the UE includes a UE capability to simultaneously transmit uplink control channel and uplink shared channel messages. The uplink reception element 1235 may be configured as or otherwise support a means for receiving, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Figure 13:
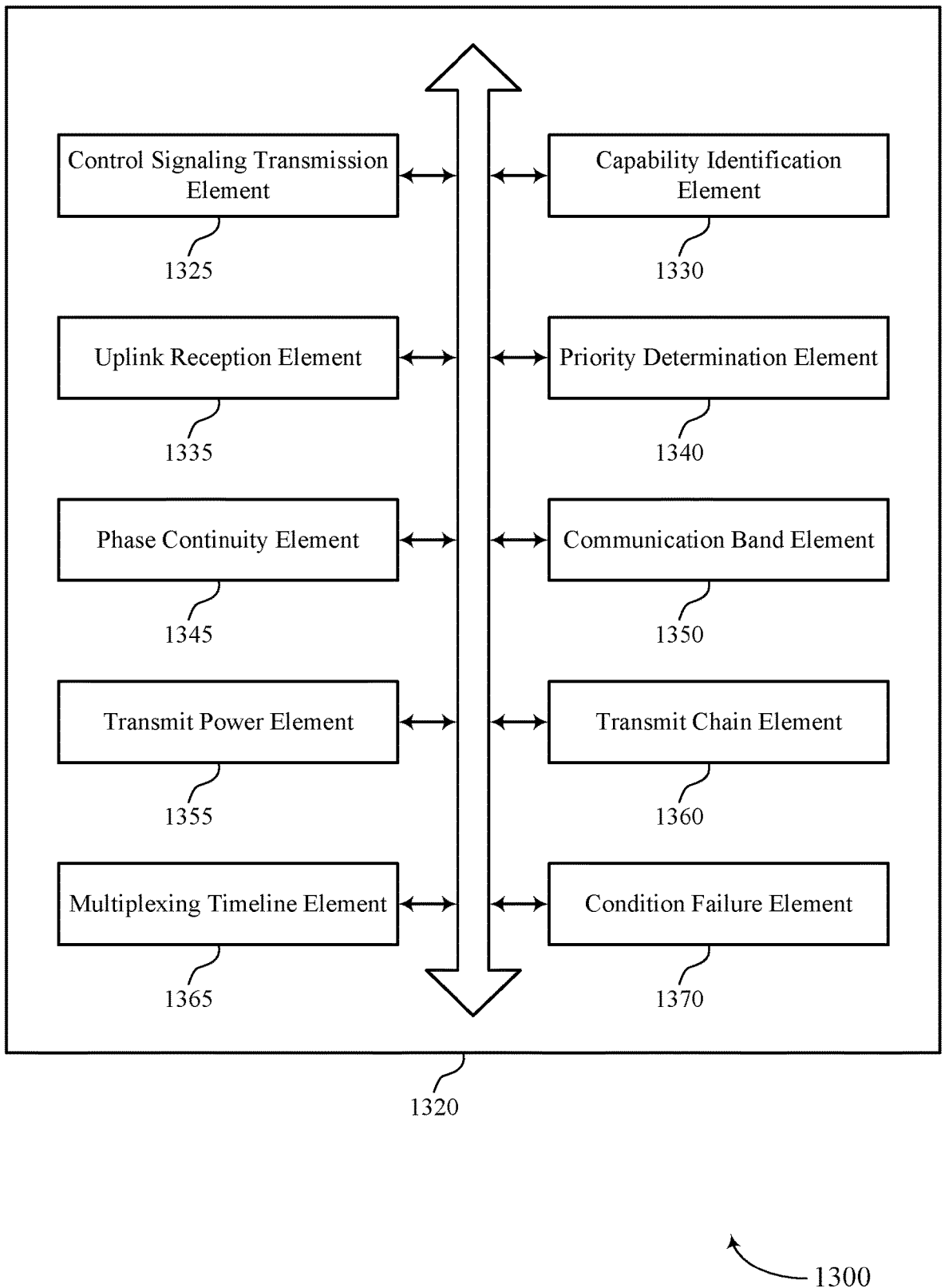
FIG. 13 shows a block diagram of a communications manager that supports intra-UE multiplexing and simultaneous transmission in accordance with aspects of the present disclosure.

FIG. 13 shows a block diagram 1300 of a communications manager 1320 that supports intra-UE multiplexing and simultaneous transmission in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of intra-UE multiplexing and simultaneous transmission as described herein. For example, the communications manager 1320 may include a control signaling transmission element 1325, a capability identification element 1330, an uplink reception element 1335, a priority determination element 1340, a phase continuity element 1345, a communication band element 1350, a transmit power element 1355, a transmit chain element 1360, a multiplexing timeline element 1365, a condition failure element 1370, or any combination thereof. Each of these components may communicate, directly or indirectly, with one another (e.g., via one or more buses).

The control signaling transmission element 1325 may be configured as or otherwise support a means for transmitting, to a UE, control signaling that schedules the UE for transmission of a first uplink control channel message on a first component carrier during first time domain resources and a first uplink shared channel message on a second component carrier during second time domain resources, where the second time domain resources at least partially overlap in time with the first time domain resources. The capability identification element 1330 may be configured as or otherwise support a means for identifying that the UE includes a UE capability to simultaneously transmit uplink control channel and uplink shared channel messages. The uplink reception element 1335 may be configured as or otherwise support a means for receiving, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

In some examples, the control signaling transmission element 1325 may be configured as or otherwise support a means for transmitting control signaling indicating that simultaneous transmission of the uplink control channel and uplink shared channel messages is enabled, where the condition includes receiving the control signaling indicating enablement of simultaneous transmission.

In some examples, the priority determination element 1340 may be configured as or otherwise support a means for determining that the condition is satisfied, where the condition is satisfied by a first priority associated with the first uplink control channel message being different than a second priority associated with the first uplink shared channel message.

In some examples, the phase continuity element 1345 may be configured as or otherwise support a means for determining that the condition is satisfied, where the condition is satisfied based on whether a second condition is satisfied, where the second condition pertains to the UE maintaining phase continuity throughout at least a portion of the transmission of the first uplink control channel message and the first uplink shared channel message.

In some examples, the phase continuity element 1345 may be configured as or otherwise support a means for determining that the second condition is satisfied, where the UE maintains phase continuity based on a symbol alignment between the first uplink control channel message and the first uplink shared channel message.

In some examples, the symbol alignment includes a full overlap in time between the first time domain resources and the second time domain resources.

In some examples, the UE maintains phase continuity based on the first uplink control channel message and the first uplink shared channel message being scheduled on a same band.

In some examples, the communication band element 1350 may be configured as or otherwise support a means for determining that the condition is satisfied, where the condition is satisfied by the first uplink control channel message and the first uplink shared channel message being scheduled on different bands.

In some examples, the transmit power element 1355 may be configured as or otherwise support a means for determining that the condition is satisfied, where the condition is satisfied by a total transmit power associated with the first uplink control channel message and the first uplink shared channel message being less than or equal to a maximum transmit power capability of the UE.

In some examples, the transmit power element 1355 may be configured as or otherwise support a means for determining the total combined transmit power based on a most recently transmitted power headroom report transmitted by the UE.

In some examples, the most recently transmitted power headroom report includes a power headroom report transmitted within a threshold number of slots or symbols prior to either a slot or symbol in which the first uplink control channel message is scheduled or a slot or symbol in which the first uplink shared channel message is scheduled.

In some examples, the transmit chain element 1360 may be configured as or otherwise support a means for determining that the condition is satisfied, where the condition is satisfied by a number of transmit chains of which the UE is capable of utilizing being greater than or equal to a number of transmit chains associated with transmitting both the first uplink control channel message and the first uplink shared channel message.

In some examples, the number of transmit chains associated with transmitting both the first uplink control channel message and the first uplink shared channel message is associated with transmitting both the first uplink control channel message and the first uplink shared channel message and is based on one or more precoders associated with transmission of the first uplink control channel message, the first uplink shared channel message, or both.

In some examples, the number of transmit chains associated with transmission of the first uplink shared channel message is based on a rank of the first uplink shared channel message.

In some examples, the number of transmit chains of which the UE is capable is based on one or more antennas of the UE being dedicated to transmission of uplink shared channel messages.

In some examples, the number of transmit chains of which the UE is capable is based on one or more antennas of the UE being designated for use with both the first component carrier and the second component carrier.

In some examples, the multiplexing timeline element 1365 may be configured as or otherwise support a means for determining that the condition is satisfied, where the condition is satisfied at least in part by at least one of a grant associated with the first uplink control channel message or a grant associated with the first uplink shared channel message being less than a threshold time before the first uplink control channel message or the first uplink shared channel message, respectively, where the threshold time is associated with a multiplexing timeline.

In some examples, the condition defines that, upon failure of the condition to be satisfied, the UE is to multiplex an uplink control information of the first uplink control channel message onto the first uplink shared channel message on the second component carrier during the second time domain resources.

In some examples, the condition defines that, upon failure of the condition to be satisfied, the UE is to drop a first channel associated with either the first uplink control channel message or the first uplink shared channel message that has a lower priority than a priority of a second channel associated with either the first uplink control channel message or the first uplink shared channel message and that the UE is to transmit either the first uplink control channel message or the first uplink shared channel message using the second channel.

Figure 14:
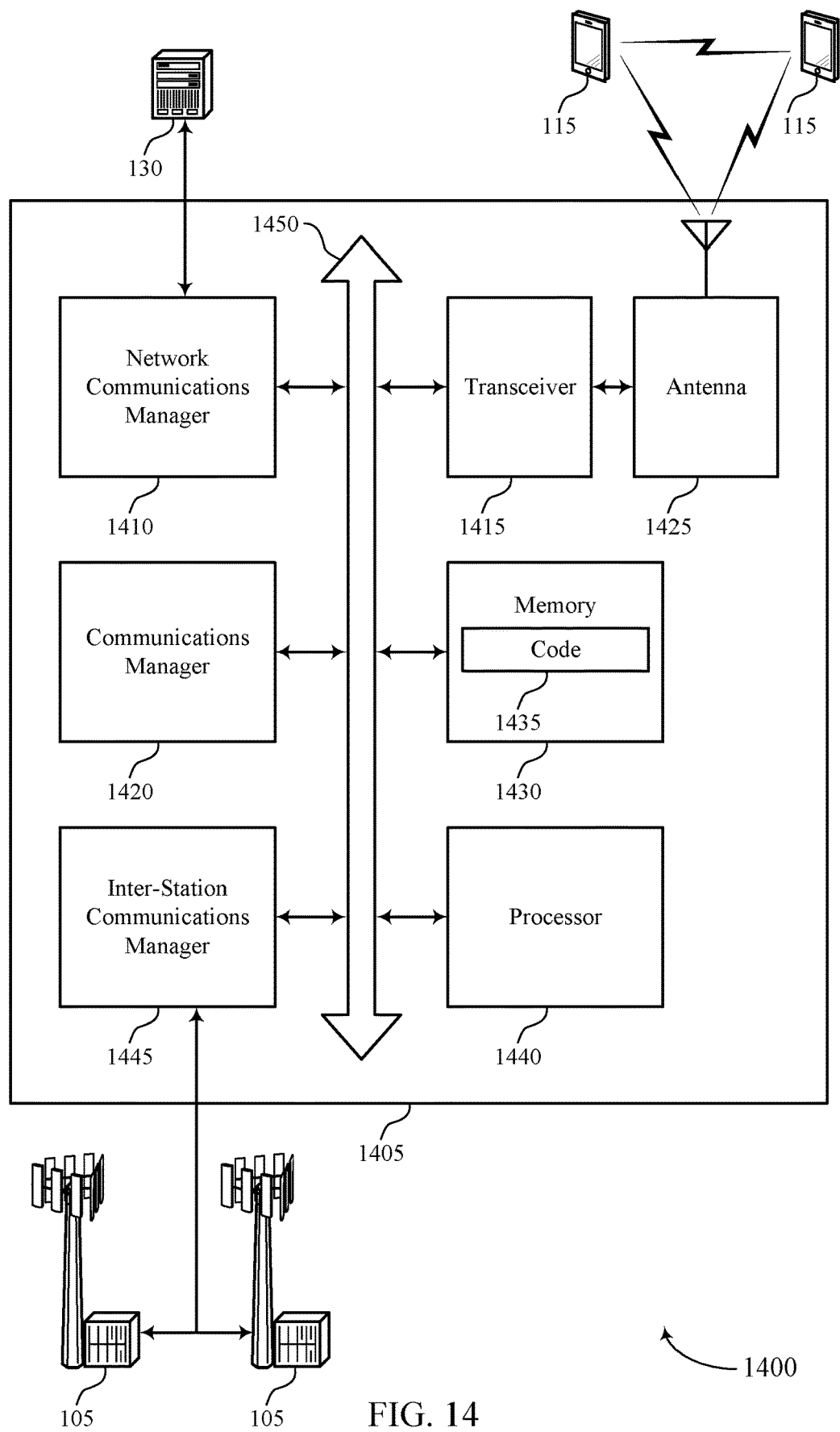
FIG. 14 shows a diagram of a system including a device that supports intra-UE multiplexing and simultaneous transmission in accordance with aspects of the present disclosure.

FIG. 14 shows a diagram of a system 1400 including a device 1405 that supports intra-UE multiplexing and simultaneous transmission in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory.

In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting intra-UE multiplexing and simultaneous transmission). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

For example, the communications manager 1420 may be configured as or otherwise support a means for transmitting, to a UE, control signaling that schedules the UE for transmission of a first uplink control channel message on a first component carrier during first time domain resources and a first uplink shared channel message on a second component carrier during second time domain resources, where the second time domain resources at least partially overlap in time with the first time domain resources. The communications manager 1420 may be configured as or otherwise support a means for identifying that the UE includes a UE capability to simultaneously transmit uplink control channel and uplink shared channel messages. The communications manager 1420 may be configured as or otherwise support a means for receiving, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of intra-UE multiplexing and simultaneous transmission as described herein, or the processor 1440 and the memory 1430 may be otherwise configured to perform or support such operations.

Figure 15:
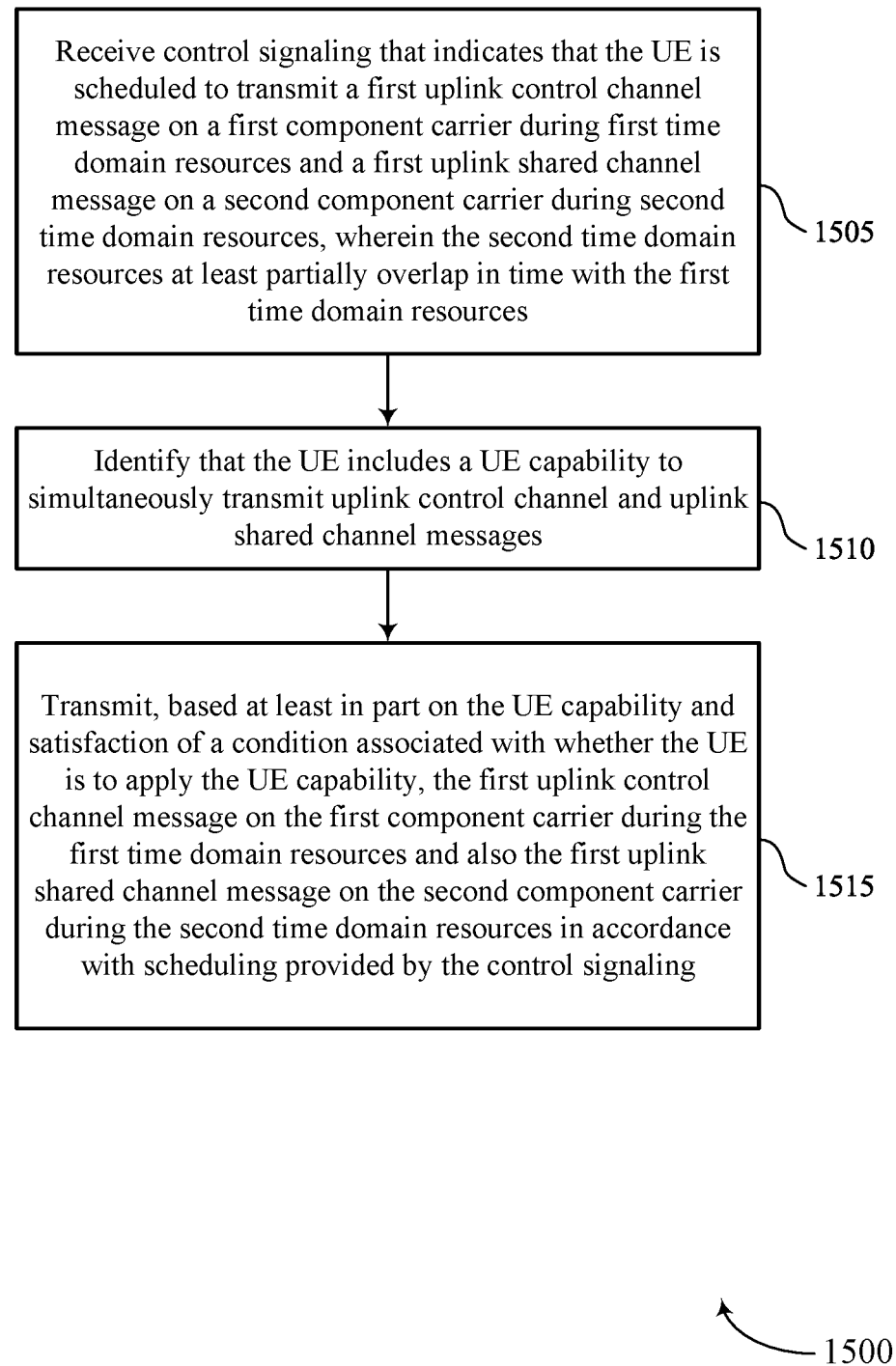
FIGS. 15 through 19 show flowcharts illustrating methods that support intra-UE multiplexing and simultaneous transmission in accordance with aspects of the present disclosure.

FIG. 15 shows a flowchart illustrating a method 1500 that supports intra-UE multiplexing and simultaneous transmission in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The operations of 1505 may be performed in accordance with examples as disclosed herein. In some examples, aspects of the operations of 1505 may be performed by a control signaling reception component 925 as described with reference to FIG. 9.

At 1510, the method may include identifying that the UE includes a UE capability to simultaneously transmit uplink control channel and uplink shared channel messages. The operations of 1510 may be performed in accordance with examples as disclosed herein. In some examples, aspects of the operations of 1510 may be performed by a capability identification component 930 as described with reference to FIG. 9.

At 1515, the method may include transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling. The operations of 1515 may be performed in accordance with examples as disclosed herein. In some examples, aspects of the operations of 1515 may be performed by an uplink transmission component 935 as described with reference to FIG. 9.

Figure 16:
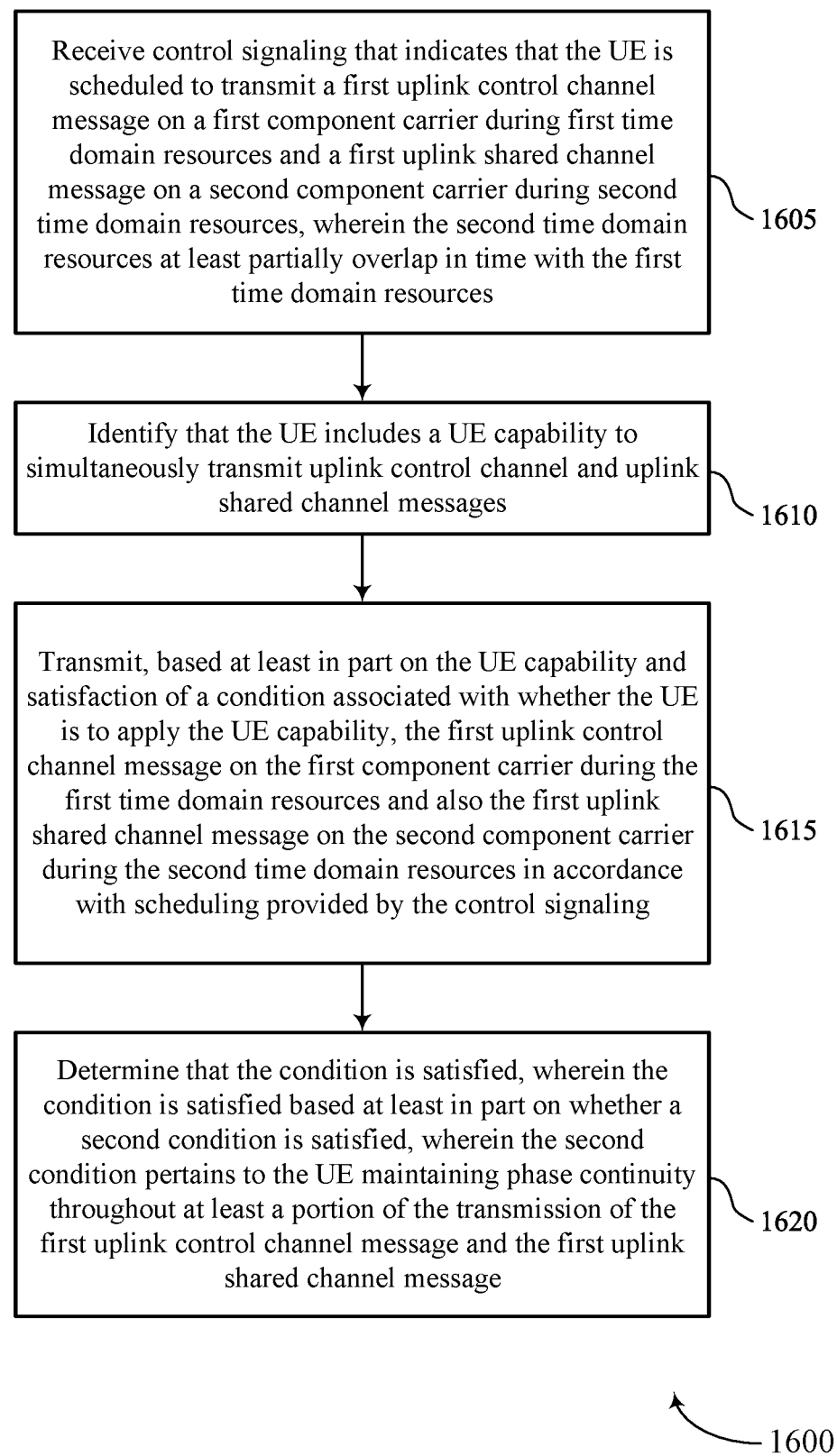

FIG. 16 shows a flowchart illustrating a method 1600 that supports intra-UE multiplexing and simultaneous transmission in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The operations of 1605 may be performed in accordance with examples as disclosed herein. In some examples, aspects of the operations of 1605 may be performed by a control signaling reception component 925 as described with reference to FIG. 9.

At 1610, the method may include identifying that the UE includes a UE capability to simultaneously transmit uplink control channel and uplink shared channel messages. The operations of 1610 may be performed in accordance with examples as disclosed herein. In some examples, aspects of the operations of 1610 may be performed by a capability identification component 930 as described with reference to FIG. 9.

At 1615, the method may include transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling. The operations of 1615 may be performed in accordance with examples as disclosed herein. In some examples, aspects of the operations of 1615 may be performed by an uplink transmission component 935 as described with reference to FIG. 9.

At 1620, the method may include determining that the condition is satisfied, where the condition is satisfied based on whether a second condition is satisfied, where the second condition pertains to the UE maintaining phase continuity throughout at least a portion of the transmission of the first uplink control channel message and the first uplink shared channel message. The operations of 1620 may be performed in accordance with examples as disclosed herein. In some examples, aspects of the operations of 1620 may be performed by a phase continuity component 945 as described with reference to FIG. 9.

Figure 17:
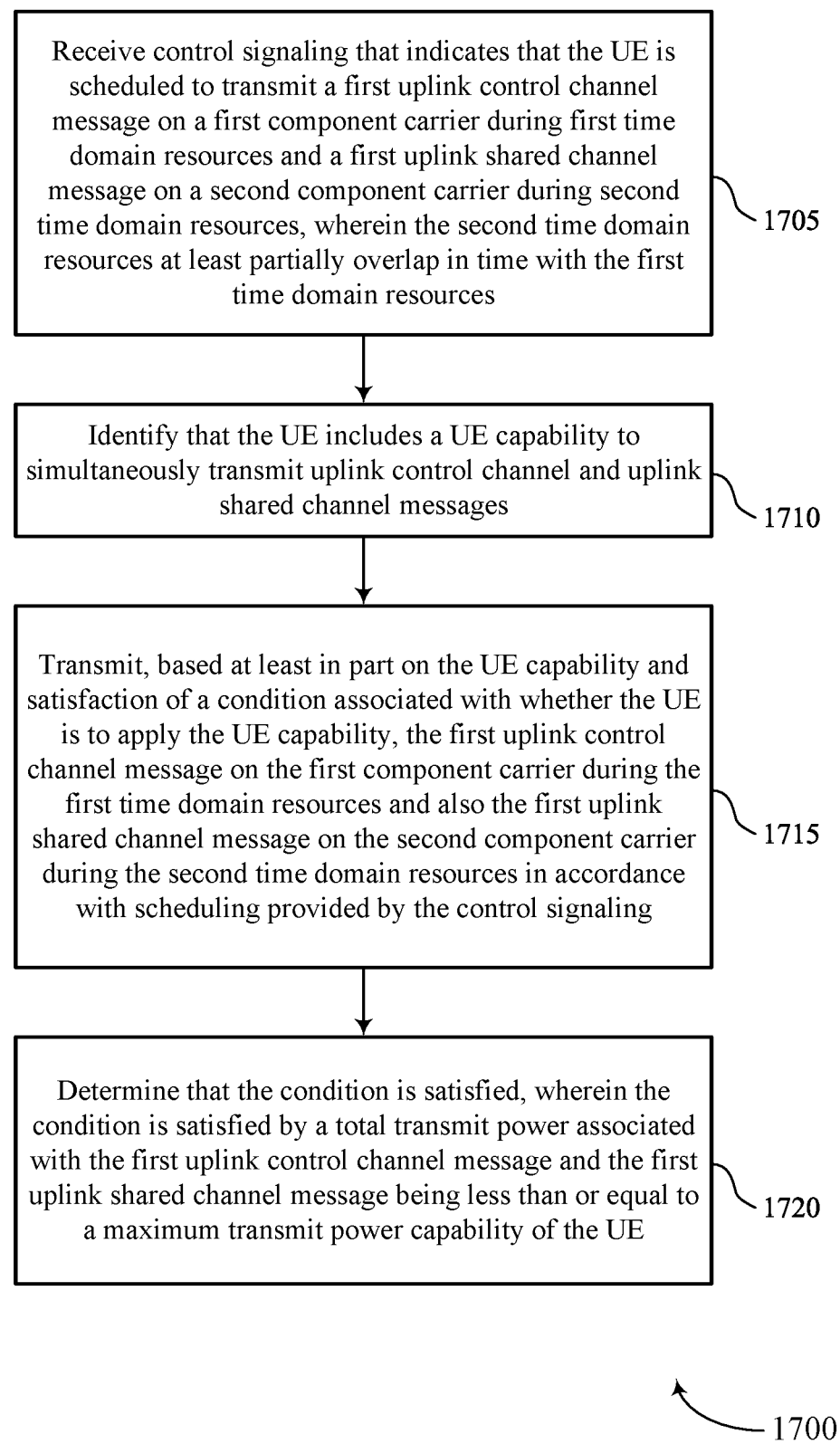

FIG. 17 shows a flowchart illustrating a method 1700 that supports intra-UE multiplexing and simultaneous transmission in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The operations of 1705 may be performed in accordance with examples as disclosed herein. In some examples, aspects of the operations of 1705 may be performed by a control signaling reception component 925 as described with reference to FIG. 9.

At 1710, the method may include identifying that the UE includes a UE capability to simultaneously transmit uplink control channel and uplink shared channel messages. The operations of 1710 may be performed in accordance with examples as disclosed herein. In some examples, aspects of the operations of 1710 may be performed by a capability identification component 930 as described with reference to FIG. 9.

At 1715, the method may include transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling. The operations of 1715 may be performed in accordance with examples as disclosed herein. In some examples, aspects of the operations of 1715 may be performed by an uplink transmission component 935 as described with reference to FIG. 9.

At 1720, the method may include determining that the condition is satisfied, where the condition is satisfied by a total transmit power associated with the first uplink control channel message and the first uplink shared channel message being less than or equal to a maximum transmit power capability of the UE. The operations of 1720 may be performed in accordance with examples as disclosed herein. In some examples, aspects of the operations of 1720 may be performed by a transmit power component 955 as described with reference to FIG. 9.

Figure 18:
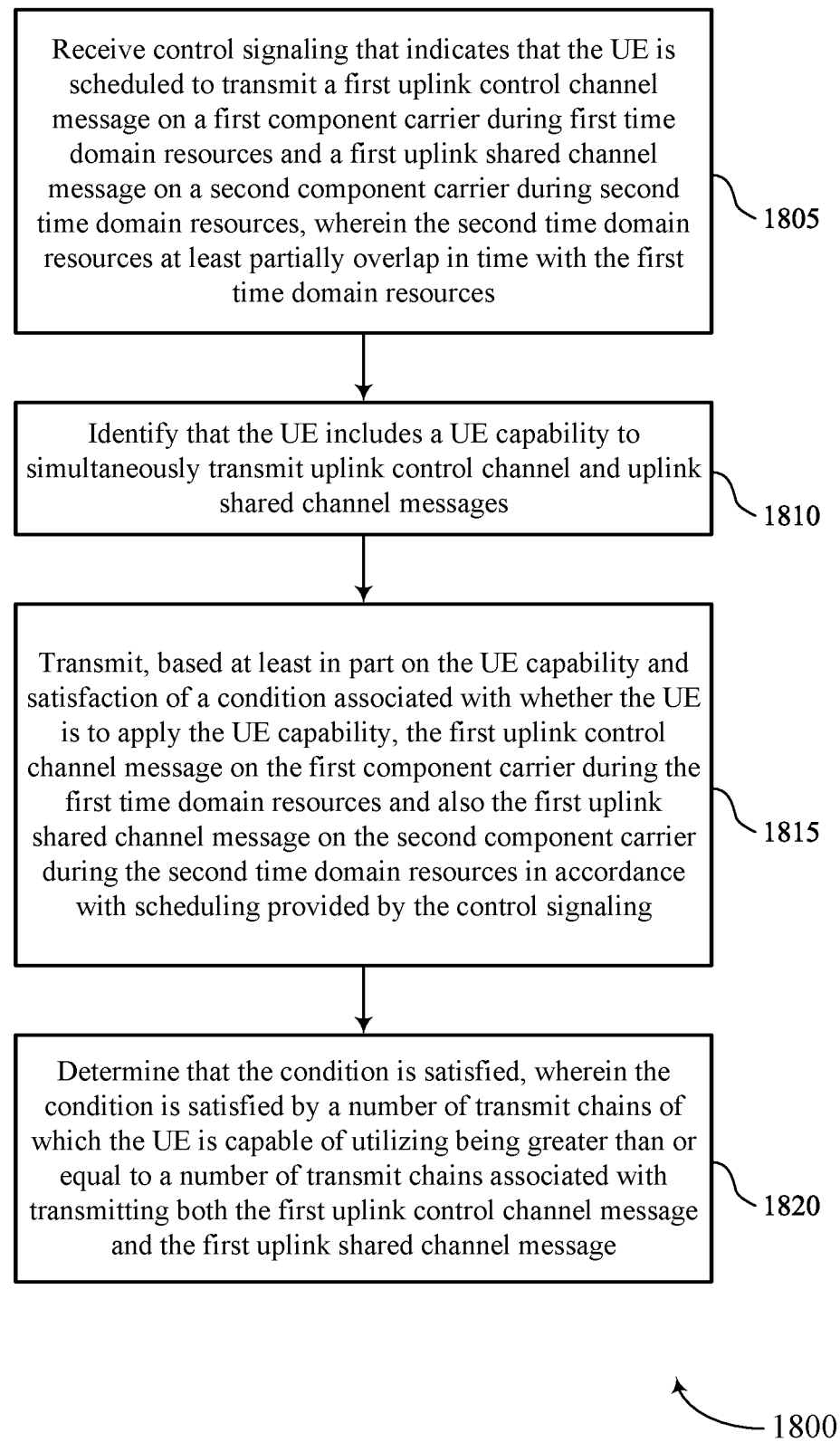

FIG. 18 shows a flowchart illustrating a method 1800 that supports intra-UE multiplexing and simultaneous transmission in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The operations of 1805 may be performed in accordance with examples as disclosed herein. In some examples, aspects of the operations of 1805 may be performed by a control signaling reception component 925 as described with reference to FIG. 9.

At 1810, the method may include identifying that the UE includes a UE capability to simultaneously transmit uplink control channel and uplink shared channel messages. The operations of 1810 may be performed in accordance with examples as disclosed herein. In some examples, aspects of the operations of 1810 may be performed by a capability identification component 930 as described with reference to FIG. 9.

At 1815, the method may include transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling. The operations of 1815 may be performed in accordance with examples as disclosed herein. In some examples, aspects of the operations of 1815 may be performed by an uplink transmission component 935 as described with reference to FIG. 9.

At 1820, the method may include determining that the condition is satisfied, where the condition is satisfied by a number of transmit chains of which the UE is capable of utilizing being greater than or equal to a number of transmit chains associated with transmitting both the first uplink control channel message and the first uplink shared channel message. The operations of 1820 may be performed in accordance with examples as disclosed herein. In some examples, aspects of the operations of 1820 may be performed by a transmit chain component 960 as described with reference to FIG. 9.

Figure 19:
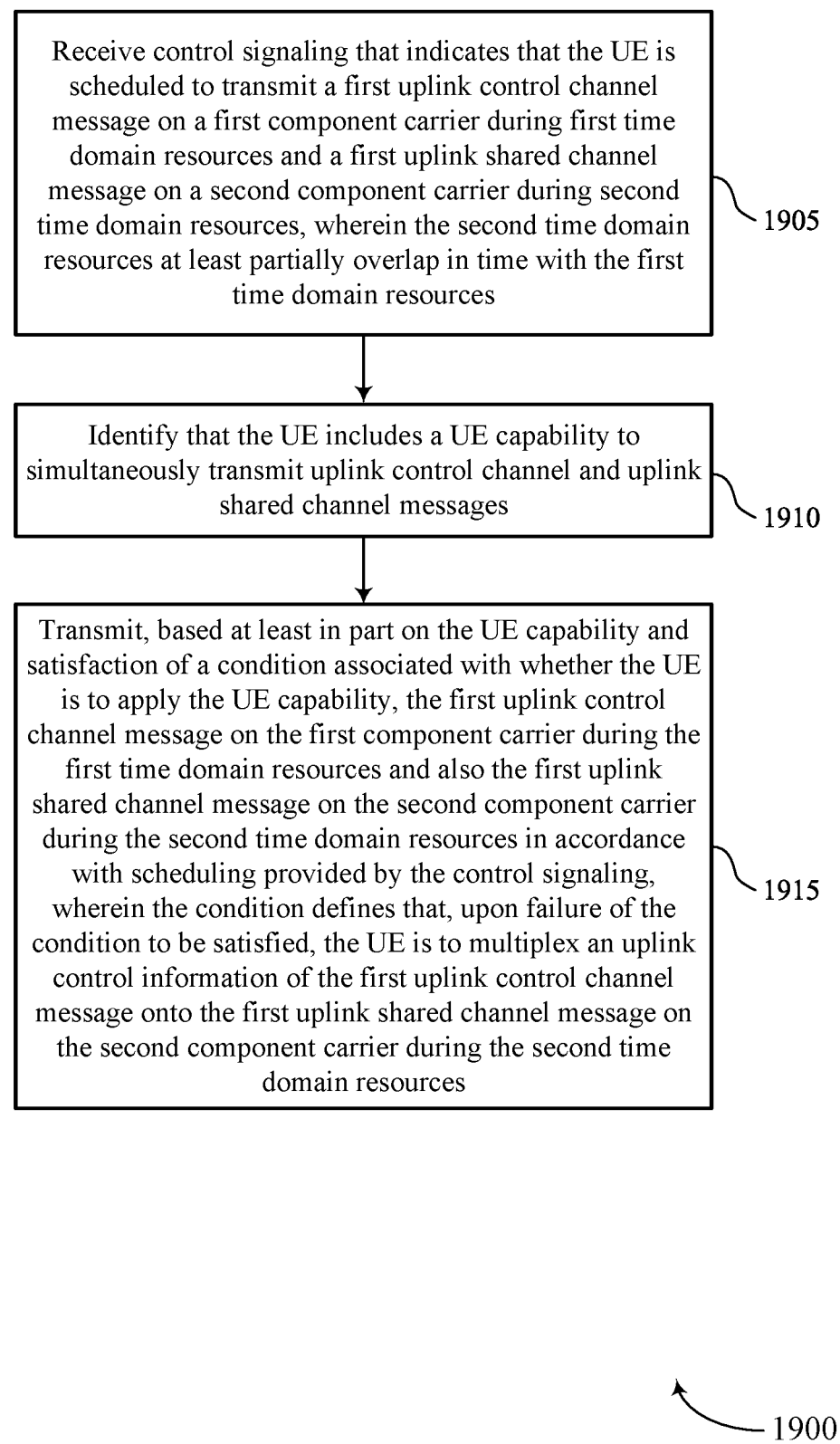

FIG. 19 shows a flowchart illustrating a method 1900 that supports intra-UE multiplexing and simultaneous transmission in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1905, the method may include receiving control signaling that indicates that the UE is scheduled to transmit a first uplink control channel message on a first component carrier during first time domain resources and a first uplink shared channel message on a second component carrier during second time domain resources, where the second time domain resources at least partially overlap in time with the first time domain resources. The operations of 1905 may be performed in accordance with examples as disclosed herein. In some examples, aspects of the operations of 1905 may be performed by a control signaling reception component 925 as described with reference to FIG. 9.

At 1910, the method may include identifying that the UE includes a UE capability to simultaneously transmit uplink control channel and uplink shared channel messages. The operations of 1910 may be performed in accordance with examples as disclosed herein. In some examples, aspects of the operations of 1910 may be performed by a capability identification component 930 as described with reference to FIG. 9.

At 1915, the method may include transmitting, based on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling. Additionally or alternatively, the method may include that the condition defines that, upon failure of the condition to be satisfied, the UE is to multiplex an uplink control information of the first uplink control channel message onto the first uplink shared channel message on the second component carrier during the second time domain resources. Additionally, or alternatively, the method may include the condition defining that, upon failure of the condition to be satisfied, the UE is to drop a first channel associated with either the first uplink control channel message or the first uplink shared channel message that has a lower priority than a priority of a second channel associated with either the first uplink control channel message or the first uplink shared channel message and that the UE is to transmit either the first uplink control channel message or the first uplink shared channel message using the second channel. The operations of 1915 may be performed in accordance with examples as disclosed herein. In some examples, aspects of the operations of 1915 may be performed by an uplink transmission component 935 as described with reference to FIG. 9.

The following provides an overview of aspects of the present disclosure:

Aspect 1: A method for wireless communications at a UE, comprising: receiving control signaling that indicates that the UE is scheduled to transmit a first uplink control channel message on a first component carrier during first time domain resources and a first uplink shared channel message on a second component carrier during second time domain resources, wherein the second time domain resources at least partially overlap in time with the first time domain resources; identifying that the UE includes a UE capability to simultaneously transmit uplink control channel and uplink shared channel messages; and transmitting, based at least in part on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Aspect 2: The method of aspect 1, further comprising: receiving control signaling indicating that simultaneous transmission of the uplink control channel and uplink shared channel messages is enabled, wherein the condition comprises receiving the control signaling indicating enablement of simultaneous transmission.

Aspect 3: The method of any of aspects 1 through 2, further comprising: determining that the condition is satisfied, wherein the condition is satisfied by a first priority associated with the first uplink control channel message being different than a second priority associated with the first uplink shared channel message.

Aspect 4: The method of any of aspects 1 through 3, further comprising: determining that the condition is satisfied based at least in part on whether a second condition is satisfied, wherein the second condition pertains to the UE maintaining phase continuity throughout at least a portion of the transmission of the first uplink control channel message and the first uplink shared channel message.

Aspect 5: The method of aspect 4, further comprising: determining that the second condition is satisfied, wherein the UE maintains phase continuity based at least in part on a symbol alignment between the first uplink control channel message and the first uplink shared channel message.

Aspect 6: The method of aspect 5, wherein the symbol alignment comprises a full overlap in time between the first time domain resources and the second time domain resources.

Aspect 7: The method of any of aspects 5 through 6, wherein the UE maintains phase continuity based at least in part on the first uplink control channel message and the first uplink shared channel message being scheduled on a same band.

Aspect 8: The method of any of aspects 1 through 7, further comprising: determining that the condition is satisfied, wherein the condition is satisfied by the first uplink control channel message and the first uplink shared channel message being scheduled on different bands.

Aspect 9: The method of any of aspects 1 through 8, further comprising: determining that the condition is satisfied, wherein the condition is satisfied by a total transmit power associated with the first uplink control channel message and the first uplink shared channel message being less than or equal to a maximum transmit power capability of the UE.

Aspect 10: The method of aspect 9, further comprising: determining the total combined transmit power based at least in part on a most recently transmitted power headroom report transmitted by the UE.

Aspect 11: The method of aspect 10, wherein the most recently transmitted power headroom report comprises a power headroom report transmitted within a threshold number of slots or symbols prior to either a slot or symbol in which the first uplink control channel message is scheduled or a slot or symbol in which the first uplink shared channel message is scheduled.

Aspect 12: The method of any of aspects 1 through 11, further comprising: determining that the condition is satisfied, wherein the condition is satisfied by a number of transmit chains of which the UE is capable of utilizing being greater than or equal to a number of transmit chains associated with transmitting both the first uplink control channel message and the first uplink shared channel message.

Aspect 13: The method of aspect 12, wherein the number of transmit chains is associated with transmitting both the first uplink control channel message and the first uplink shared channel message and is based at least in part on one or more precoders associated with transmission of the first uplink control channel message, the first uplink shared channel message, or both.

Aspect 14: The method of any of aspects 12 through 13, wherein the number of transmit chains associated with transmission of the first uplink shared channel message is based at least in part on a rank of the first uplink shared channel message.

Aspect 15: The method of any of aspects 12 through 14, wherein the number of transmit chains of which the UE is capable is based at least in part on one or more antennas of the UE being dedicated to transmission of uplink shared channel messages.

Aspect 16: The method of any of aspects 12 through 15, wherein the number of transmit chains of which the UE is capable is based at least in part on one or more antennas of the UE being designated for use with both the first component carrier and the second component carrier.

Aspect 17: The method of any of aspects 1 through 16, further comprising: determining that the condition is satisfied, wherein the condition is satisfied at least in part by at least one of a grant associated with the first uplink control channel message or a grant associated with the first uplink shared channel message being less than a threshold time before the first uplink control channel message or the first uplink shared channel message, respectively, wherein the threshold time is associated with a multiplexing timeline.

Aspect 18: The method of any of aspects 1 through 17, wherein the condition defines that, upon failure of the condition to be satisfied, the UE is to multiplex an uplink control information of the first uplink control channel message onto the first uplink shared channel message on the second component carrier during the second time domain resources.

Aspect 19: The method of any of aspects 1 through 18, wherein the condition defines that, upon failure of the condition to be satisfied, the UE is to drop a first channel associated with either the first uplink control channel message or the first uplink shared channel message that has a lower priority than a priority of a second channel associated with either the first uplink control channel message or the first uplink shared channel message and that the UE is to transmit either the first uplink control channel message or the first uplink shared channel message using the second channel.

Aspect 20: A method for wireless communications at a base station, comprising: transmitting, to a UE, control signaling that schedules the UE for transmission of a first uplink control channel message on a first component carrier during first time domain resources and a first uplink shared channel message on a second component carrier during second time domain resources, wherein the second time domain resources at least partially overlap in time with the first time domain resources; identifying that the UE includes a UE capability to simultaneously transmit uplink control channel and uplink shared channel messages; and receiving, based at least in part on the UE capability and satisfaction of a condition associated with whether the UE is to apply the UE capability, the first uplink control channel message on the first component carrier during the first time domain resources and also the first uplink shared channel message on the second component carrier during the second time domain resources in accordance with scheduling provided by the control signaling.

Aspect 21: The method of aspect 20, further comprising: transmitting control signaling indicating that simultaneous transmission of the uplink control channel and uplink shared channel messages is enabled, wherein the condition comprises receiving the control signaling indicating enablement of simultaneous transmission.

Aspect 22: The method of any of aspects 20 through 21, further comprising: determining that the condition is satisfied, wherein the condition is satisfied by a first priority associated with the first uplink control channel message being different than a second priority associated with the first uplink shared channel message.

Aspect 23: The method of any of aspects 20 through 22, further comprising: determining that the condition is satisfied, wherein the condition is satisfied based at least in part on whether a second condition is satisfied, wherein the second condition pertains to the UE maintaining phase continuity throughout at least a portion of the transmission of the first uplink control channel message and the first uplink shared channel message.

Aspect 24: The method of aspect 23, further comprising: determining that the second condition is satisfied, wherein the UE maintains phase continuity based at least in part on a symbol alignment between the first uplink control channel message and the first uplink shared channel message.

Aspect 25: The method of aspect 24, wherein the symbol alignment comprises a full overlap in time between the first time domain resources and the second time domain resources.

Aspect 26: The method of any of aspects 24 through 25, wherein the UE maintains phase continuity based at least in part on the first uplink control channel message and the first uplink shared channel message being scheduled on a same band.

Aspect 27: The method of any of aspects 20 through 26, further comprising: determining that the condition is satisfied, wherein the condition is satisfied by the first uplink control channel message and the first uplink shared channel message being scheduled on different bands.

Aspect 28: The method of any of aspects 20 through 27, further comprising: determining that the condition is satisfied, wherein the condition is satisfied by a total transmit power associated with the first uplink control channel message and the first uplink shared channel message being less than or equal to a maximum transmit power capability of the UE.

Aspect 29: The method of aspect 28, further comprising: determining the total combined transmit power based at least in part on a most recently transmitted power headroom report transmitted by the UE.

Aspect 30: The method of aspect 29, wherein the most recently transmitted power headroom report comprises a power headroom report transmitted within a threshold number of slots or symbols prior to either a slot or symbol in which the first uplink control channel message is scheduled or a slot or symbol in which the first uplink shared channel message is scheduled.

Aspect 31: The method of any of aspects 20 through 30, further comprising: determining that the condition is satisfied, wherein the condition is satisfied by a number of transmit chains of which the UE is capable of utilizing being greater than or equal to a number of transmit chains associated with transmitting both the first uplink control channel message and the first uplink shared channel message.

Aspect 32: The method of aspect 31, wherein the number of transmit chains is associated with transmitting both the first uplink control channel message and the first uplink shared channel message and is based at least in part on one or more precoders associated with transmission of the first uplink control channel message, the first uplink shared channel message, or both.

Aspect 33: The method of any of aspects 31 through 32, wherein the number of transmit chains associated with transmission of the first uplink shared channel message is based at least in part on a rank of the first uplink shared channel message.

Aspect 34: The method of any of aspects 31 through 33, wherein the number of transmit chains of which the UE is capable is based at least in part on one or more antennas of the UE being dedicated to transmission of uplink shared channel messages.

Aspect 35: The method of any of aspects 31 through 34, wherein the number of transmit chains of which the UE is capable is based at least in part on one or more antennas of the UE being designated for use with both the first component carrier and the second component carrier.

Aspect 36: The method of any of aspects 20 through 35, further comprising: determining that the condition is satisfied, wherein the condition is satisfied at least in part by at least one of a grant associated with the first uplink control channel message or a grant associated with the first uplink shared channel message being less than a threshold time before the first uplink control channel message or the first uplink shared channel message, respectively, wherein the threshold time is associated with a multiplexing timeline.

Aspect 37: The method of any of aspects 20 through 36, wherein the condition defines that, upon failure of the condition to be satisfied, the UE is to multiplex an uplink control information of the first uplink control channel message onto the first uplink shared channel message on the second component carrier during the second time domain resources.

Aspect 38: The method of any of aspects 20 through 37, wherein the condition defines that, upon failure of the condition to be satisfied, the UE is to drop a first channel associated with either the first uplink control channel message or the first uplink shared channel message that has a lower priority than a priority of a second channel associated with either the first uplink control channel message or the first uplink shared channel message and that the UE is to transmit either the first uplink control channel message or the first uplink shared channel message using the second channel.

Aspect 39: An apparatus for wireless communications at a UE, comprising a processor; memory coupled with the processor; and instructions stored in the memory and executable by the processor to cause the apparatus to perform a method of any of aspects 1 through 19.

Aspect 40: An apparatus for wireless communications at a UE, comprising at least one means for performing a method of any of aspects 1 through 19.

Aspect 41: A non-transitory computer-readable medium storing code for wireless communications at a UE, the code comprising instructions executable by a processor to perform a method of any of aspects 1 through 19.

Aspect 42: An apparatus comprising a processor; memory coupled with the processor; and instructions stored in the memory and executable by the processor to cause the apparatus to perform a method of any of aspects 20 through 38.

Aspect 43: An apparatus comprising at least one means for performing a method of any of aspects 20 through 38.

Aspect 44: A non-transitory computer-readable medium storing code the code comprising instructions executable by a processor to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
receive control signaling that indicates that the UE is scheduled to transmit a first uplink control channel message on a first component carrier during first time domain resources and a first uplink shared channel message on a second component carrier during second time domain resources, wherein the second time domain resources at least partially overlap in time with the first time domain resources, and wherein the first component carrier and the second component carrier are different component carriers;
determine whether the first uplink control channel message and the first uplink shared channel message have a same priority or different priorities; and
transmit, based at least in part on whether the UE includes a UE capability to simultaneously transmit uplink control channel and uplink shared channel messages and further based at least in part on satisfaction of a condition for simultaneous transmission associated with whether the UE is to apply the UE capability, the first uplink control channel message on the first component carrier during the first time domain resources and also the first uplink shared channel message on the second component carrier during the second time domain resources in accordance with scheduling provided by the control signaling, wherein the condition for simultaneous transmission comprises the first uplink control channel message and the first uplink shared channel message having the different priorities.

2. The apparatus of claim 1, wherein the instructions are further executable by the processor to cause the apparatus to:
receive a configuration indicating that simultaneous transmission of the uplink control channel and uplink shared channel messages is enabled, wherein the condition further comprises receiving the configuration indicating enablement of simultaneous transmission.

3. The apparatus of claim 1, wherein the instructions are further executable by the processor to cause the apparatus to:
determine that the condition is satisfied, wherein the condition further comprises the first uplink control channel message and the first uplink shared channel message being scheduled on different frequency bands.

4. The apparatus of claim 1, wherein the instructions are further executable by the processor to cause the apparatus to:
determine that the condition is satisfied, wherein the condition is satisfied by a first priority associated with the first uplink control channel message being different than a second priority associated with the first uplink shared channel message.

5. The apparatus of claim 1, wherein the instructions are further executable by the processor to cause the apparatus to:
determine that the condition is satisfied, wherein the condition further comprises satisfaction of a second condition, wherein the second condition pertains to the UE maintaining phase continuity throughout at least a portion of the transmission of the first uplink control channel message and the first uplink shared channel message.

6. The apparatus of claim 5, wherein the instructions are further executable by the processor to cause the apparatus to:
determine that the second condition is satisfied, wherein the UE maintains phase continuity based at least in part on a symbol alignment between the first uplink control channel message and the first uplink shared channel message.

7. The apparatus of claim 6, wherein the symbol alignment comprises a full overlap in time between the first time domain resources and the second time domain resources.

8. The apparatus of claim 6, wherein the UE maintains phase continuity based at least in part on the first uplink control channel message and the first uplink shared channel message being scheduled on a same band.

9. The apparatus of claim 1, wherein the instructions are further executable by the processor to cause the apparatus to:
determine that the condition is satisfied, wherein the condition further comprises a total transmit power associated with the first uplink control channel message and the first uplink shared channel message being less than or equal to a maximum transmit power capability of the UE.

10. The apparatus of claim 9, wherein the instructions are further executable by the processor to cause the apparatus to:
determine the total transmit power based at least in part on a most recently transmitted power headroom report transmitted by the UE.

11. The apparatus of claim 10, wherein the most recently transmitted power headroom report comprises a power headroom report transmitted within a threshold number of slots or symbols prior to either a slot or symbol in which the first uplink control channel message is scheduled or a slot or symbol in which the first uplink shared channel message is scheduled.

12. The apparatus of claim 1, wherein the instructions are further executable by the processor to cause the apparatus to:
determine that the condition is satisfied, wherein the condition further comprises a number of transmit chains of which the UE is capable of utilizing being greater than or equal to a number of transmit chains associated with transmitting both the first uplink control channel message and the first uplink shared channel message.

13. The apparatus of claim 12, wherein the number of transmit chains associated with transmitting both the first uplink control channel message and the first uplink shared channel message is associated with transmitting both the first uplink control channel message and the first uplink shared channel message and is based at least in part on one or more precoders associated with transmission of the first uplink control channel message, the first uplink shared channel message, or both.

14. The apparatus of claim 12, wherein the number of transmit chains associated with transmission of the first uplink shared channel message is based at least in part on a rank of the first uplink shared channel message.

15. The apparatus of claim 12, wherein the number of transmit chains of which the UE is capable is based at least in part on one or more antennas of the UE being dedicated to transmission of uplink shared channel messages.

16. The apparatus of claim 12, wherein the number of transmit chains of which the UE is capable is based at least in part on one or more antennas of the UE being designated for use with both the first component carrier and the second component carrier.

17. The apparatus of claim 1, wherein the instructions are further executable by the processor to cause the apparatus to:
determine that the condition is satisfied, wherein the condition further comprises at least one of a grant associated with the first uplink control channel message or a grant associated with the first uplink shared channel message being less than a threshold time before the first uplink control channel message or the first uplink shared channel message, respectively, wherein the threshold time is associated with a multiplexing timeline.

18. The apparatus of claim 1, wherein the condition defines that, upon failure of the condition to be satisfied, the UE is to multiplex an uplink control information of the first uplink control channel message onto the first uplink shared channel message on the second component carrier during the second time domain resources.

19. The apparatus of claim 1, wherein the condition defines that, upon failure of the condition to be satisfied, the UE is to drop a first channel associated with either the first uplink control channel message or the first uplink shared channel message that has a lower priority than a priority of a second channel associated with either the first uplink control channel message or the first uplink shared channel message and that the UE is to transmit either the first uplink control channel message or the first uplink shared channel message using the second channel.

20. An apparatus for wireless communications at a base station, comprising:
a processor;
memory coupled with the processor; and
instructions stored in the memory and executable by the processor to cause the apparatus to:
transmit, to a user equipment (UE), control signaling that schedules the UE for transmission of a first uplink control channel message on a first component carrier during first time domain resources and a first uplink shared channel message on a second component carrier during second time domain resources, wherein the second time domain resources at least partially overlap in time with the first time domain resources, and wherein the first component carrier and the second component carrier are different component carriers;
determine whether the first uplink control channel message and the first uplink shared channel message have a same priority or different priorities; and
receive, based at least in part on whether the UE includes a UE capability to simultaneously transmit uplink control channel and uplink shared channel messages and further based at least in part on satisfaction of a condition for simultaneous transmission associated with whether the UE is to apply the UE capability, the first uplink control channel message on the first component carrier during the first time domain resources and also the first uplink shared channel message on the second component carrier during the second time domain resources in accordance with scheduling provided by the control signaling, wherein the condition for simultaneous transmission comprises the first uplink control channel message and the first uplink shared channel message having the different priorities.

21. The apparatus of claim 20, wherein the instructions are further executable by the processor to cause the apparatus to:
transmit a configuration indicating that simultaneous transmission of the uplink control channel and uplink shared channel messages is enabled, wherein the condition further comprises receiving the configuration indicating enablement of simultaneous transmission.

22. The apparatus of claim 20, wherein the instructions are further executable by the processor to cause the apparatus to:
determine that the condition is satisfied, wherein the condition further comprises the first uplink control channel message and the first uplink shared channel message being scheduled on different frequency bands.

23. The apparatus of claim 20, wherein the instructions are further executable by the processor to cause the apparatus to:
determine that the condition is satisfied, wherein the condition further comprises satisfaction of a second condition, wherein the second condition pertains to the UE maintaining phase continuity throughout at least a portion of the transmission of the first uplink control channel message and the first uplink shared channel message.

24. The apparatus of claim 20, wherein the instructions are further executable by the processor to cause the apparatus to:
determine that the condition is satisfied, wherein the condition further comprises a number of transmit chains of which the UE is capable of utilizing being greater than or equal to a number of transmit chains associated with transmitting both the first uplink control channel message and the first uplink shared channel message.

25. A method for wireless communications at a user equipment (UE), comprising:
receiving control signaling that indicates that the UE is scheduled to transmit a first uplink control channel message on a first component carrier during first time domain resources and a first uplink shared channel message on a second component carrier during second time domain resources, wherein the second time domain resources at least partially overlap in time with the first time domain resources, and wherein the first component carrier and the second component carrier are different component carriers;
determining whether the first uplink control channel message and the first uplink shared channel message have a same priority or different priorities; and
transmitting, based at least in part on whether the UE includes a UE capability to simultaneously transmit uplink control channel and uplink shared channel messages and further based at least in part on satisfaction of a condition for simultaneous transmission associated with whether the UE is to apply the UE capability, the first uplink control channel message on the first component carrier during the first time domain resources and also the first uplink shared channel message on the second component carrier during the second time domain resources in accordance with scheduling provided by the control signaling, wherein the condition for simultaneous transmission comprises the first uplink control channel message and the first uplink shared channel message having the different priorities.

26. The method of claim 25, further comprising:
receiving a configuration indicating that simultaneous transmission of the uplink control channel and uplink shared channel messages is enabled, wherein the condition further comprises receiving the configuration indicating enablement of simultaneous transmission.

27. The method of claim 25, further comprising:
determining that the condition is satisfied, wherein the condition further comprises the first uplink control channel message and the first uplink shared channel message being scheduled on different frequency bands.

28. A method for wireless communications at a base station, comprising:
transmitting, to a user equipment (UE), control signaling that schedules the UE for transmission of a first uplink control channel message on a first component carrier during first time domain resources and a first uplink shared channel message on a second component carrier during second time domain resources, wherein the second time domain resources at least partially overlap in time with the first time domain resources, and wherein the first component carrier and the second component carrier are different component carriers;
determining whether the first uplink control channel message and the first uplink shared channel message have a same priority or different priorities; and
receiving, based at least in part on whether the UE includes a UE capability to simultaneously transmit uplink control channel and uplink shared channel messages and further based at least in part on satisfaction of a condition for simultaneous transmission associated with whether the UE is to apply the UE capability, the first uplink control channel message on the first component carrier during the first time domain resources and also the first uplink shared channel message on the second component carrier during the second time domain resources in accordance with scheduling provided by the control signaling, wherein the condition for simultaneous transmission comprises the first uplink control channel message and the first uplink shared channel message having the different priorities.

29. The method of claim 28, further comprising:
transmitting a configuration indicating that simultaneous transmission of the uplink control channel and uplink shared channel messages is enabled, wherein the condition further comprises receiving the configuration indicating enablement of simultaneous transmission.

30. The method of claim 28, further comprising:
determining that the condition is satisfied, wherein the condition further comprises the first uplink control channel message and the first uplink shared channel message being scheduled on different frequency bands.

31. The apparatus of claim 1, wherein:
the condition for simultaneous transmission fails to be satisfied by the first uplink control channel message and the first uplink shared channel message having the same priority;
the first uplink control channel message and the first uplink shared channel message have the same priority; and
the instructions are further executable by the processor to cause the apparatus to:
multiplex uplink control information of the first uplink control channel message onto the first uplink shared channel message based at least in part on the condition failing to be satisfied.

32. The apparatus of claim 20, wherein:
the condition for simultaneous transmission fails to be satisfied by the first uplink control channel message and the first uplink shared channel message having the same priority;
the first uplink control channel message and the first uplink shared channel message have the same priority; and
the instructions are further executable by the processor to cause the apparatus to:
multiplex uplink control information of the first uplink control channel message onto the first uplink shared channel message based at least in part on the condition failing to be satisfied.

33. The method of claim 25, wherein:
the condition for simultaneous transmission fails to be satisfied by the first uplink control channel message and the first uplink shared channel message having the same priority;
the first uplink control channel message and the first uplink shared channel message have the same priority; and
the method further comprises:
multiplexing uplink control information of the first uplink control channel message onto the first uplink shared channel message based at least in part on the condition failing to be satisfied.

34. The method of claim 28, wherein:
the condition for simultaneous transmission fails to be satisfied by the first uplink control channel message and the first uplink shared channel message having the same priority;
the first uplink control channel message and the first uplink shared channel message have the same priority; and
the method further comprises:
multiplexing uplink control information of the first uplink control channel message onto the first uplink shared channel message based at least in part on the condition failing to be satisfied.

* * * * *